US009054688B2

(12) United States Patent
Clark et al.

(10) Patent No.: US 9,054,688 B2
(45) Date of Patent: Jun. 9, 2015

(54) SEQUENTIAL STATE ELEMENTS RADIATION HARDENED BY DESIGN

(71) Applicants: Lawrence T. Clark, Phoenix, AZ (US); Sandeep Shambhulingaiah, Tempe, AZ (US); Sushil Kumar, Tempe, AZ (US); Chandarasekaran Ramamurthy, Tempe, AZ (US)

(72) Inventors: Lawrence T. Clark, Phoenix, AZ (US); Sandeep Shambhulingaiah, Tempe, AZ (US); Sushil Kumar, Tempe, AZ (US); Chandarasekaran Ramamurthy, Tempe, AZ (US)

(73) Assignee: Arizona Board of Regents, a body corporate of the State of Arizona, acting for and on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 14/031,585

(22) Filed: Sep. 19, 2013

(65) Prior Publication Data

US 2014/0077854 A1    Mar. 20, 2014

Related U.S. Application Data

(60) Provisional application No. 61/702,903, filed on Sep. 19, 2012, provisional application No. 61/705,849, filed on Sep. 26, 2012.

(51) Int. Cl.
*H03K 3/289* (2006.01)
*H03K 3/356* (2006.01)
(Continued)

(52) U.S. Cl.
CPC ...... *H03K 3/356086* (2013.01); *G06F 17/5072* (2013.01); *G06F 2217/70* (2013.01); *H03K 3/0375* (2013.01); *H03K 3/35606* (2013.01); *H03K 3/35625* (2013.01)

(58) Field of Classification Search
USPC ................. 327/115, 116, 117, 118, 161, 185, 327/198–203, 208–218, 355–360; 377/47, 377/48
See application file for complete search history.

(56) References Cited

U.S. PATENT DOCUMENTS 4,621,201 A    11/1986 Amdahl et al.
5,883,814 A     3/1999 Luk et al.
(Continued)

OTHER PUBLICATIONS

Anelli, G. et al., "Radiation Tolerant VLSI Circuits in Standard Deep Submicron CMOS Technologies for the LHC Experiments: Practical Design Aspects," IEEE Transactions on Nuclear Science, vol. 46, Issue 6, pp. 1690-1696, (1999).
(Continued)

*Primary Examiner* — Brandon S Cole
(74) *Attorney, Agent, or Firm* — Withrow & Terranova, P.L.L.C.

(57) ABSTRACT

This disclosure relates generally to sequential state elements (SSEs). More specifically, embodiments of flip-flops are disclosed, along with computerized methods and systems of designing the same. In one embodiment, the flip-flop includes a substrate and subcircuits that are formed on the substrate. The subcircuits provide subfunctions, wherein each of the subcircuits provides at least one of the subfunctions. More specifically, the subfunctions are provided in a sequential logical order by the subcircuits so that the flip-flop provides a flip-flop function. However, the subcircuits are interleaved out of the sequential logical order with respect to a corresponding subfunction provided by each of the subcircuits along a vector defined by the substrate. In this manner, interleaving the subcircuits along the vector of the substrate can provide separation between charge collection nodes without requiring increases in size. Thus, the flip-flop can be more compact and less expensive to manufacture.

45 Claims, 13 Drawing Sheets

(51) Int. Cl.
*G06F 17/50* (2006.01)
*H03K 3/037* (2006.01)
*H03K 3/3562* (2006.01)

(56) References Cited

U.S. PATENT DOCUMENTS

| | | | |
|---|---|---|---|
| 6,104,211 | A | 8/2000 | Alfke |
| 6,127,864 | A | 10/2000 | Mavis et al. |
| 6,526,559 | B2 | 2/2003 | Schiefele et al. |
| 6,646,464 | B2 | 11/2003 | Maruyama |
| 6,898,770 | B2 | 5/2005 | Boluki et al. |
| 7,138,442 | B2 | 11/2006 | Smith et al. |
| 7,212,448 | B1 | 5/2007 | Trimberger |
| 7,310,759 | B1 | 12/2007 | Carmichael et al. |
| 7,404,161 | B2 | 7/2008 | Dutt et al. |
| 7,649,216 | B1 | 1/2010 | Clark et al. |
| 7,719,304 | B1 * | 5/2010 | Clark et al. ............. 326/14 |
| 7,859,292 | B1 | 12/2010 | Shuler, Jr. |
| 7,904,772 | B2 | 3/2011 | Nicolaidis |
| 7,920,410 | B1 * | 4/2011 | Lee et al. ............. 365/154 |
| 8,015,533 | B1 | 9/2011 | Burstein et al. |
| 8,122,317 | B1 | 2/2012 | Clark et al. |
| 8,161,367 | B2 * | 4/2012 | Chandra ............. 714/822 |
| 8,397,130 | B2 | 3/2013 | Clark et al. |
| 8,397,133 | B2 | 3/2013 | Clark et al. |
| 8,489,919 | B2 * | 7/2013 | Clark et al. ............. 714/11 |
| 8,493,120 | B2 | 7/2013 | Choudhury et al. |
| 8,495,548 | B2 | 7/2013 | Agarwal et al. |
| 8,729,923 | B2 | 5/2014 | Ramachandra |
| 8,791,718 | B2 | 7/2014 | Clark et al. |
| 8,863,064 | B1 | 10/2014 | Tien et al. |
| 2006/0220700 | A1 | 10/2006 | Hoover et al. |
| 2009/0184733 | A1 | 7/2009 | Lilja |
| 2009/0204933 | A1 | 8/2009 | Rezgui |
| 2012/0180005 | A1 | 7/2012 | Lilja |
| 2012/0306535 | A1 * | 12/2012 | Clark et al. ............. 326/46 |
| 2014/0049286 | A1 | 2/2014 | Clark |

OTHER PUBLICATIONS

Author Unknown, "RTAX-S/SL and RTAX-DSP Radiation-Tolerant FPGAs," Microsemi Corporation, Revision 16, Jan. 2013, 278 pages.
Benedetto, J. M. et al., "Digital Single Event Transient Trends with Technology Node Scaling," IEEE Transactions on Nuclear Science, vol. 53, Issue 6, pp. 3462-3465 (2006).
Benedetto, J. et al., "Heavy Ion-Induced Digital Single-Event Transients in Deep Submicron Processes," IEEE Transactions on Nuclear Science, vol. 51, Issue 6, pp. 3480-3485 (2004).
Benini, L. et al., "A Survey of Design Techniques for System-Level Dynamic Power Management," IEEE Transactions on Very Large Scale Integration (VLSI) Systems, vol. 8, Issue 3, pp. 299-316 (2000).
Calin, T. et al., "Upset Hardened Memory Design for Submicron CMOS Technology," IEEE Transactions on Nuclear Science, vol. 43, No. 6, Dec. 1996, pp. 2874-2878.
Diehl, S.E. et al., "Considerations for Single Event Immune VLSI Logic," IEEE Transactions on Nuclear Science, vol. 30, Issue 6, pp. 4501-4507 (1983).
Dodd, P. et al., "Production and Propagation of Single-Event Transients in High-Speed Digital Logic ICs," IEEE Transactions on Nuclear Science, vol. 51, Issue. 6, pp. 3278-3284 (2004).
Drake, A., et al., "A Self-Correcting Soft Error Tolerant Flop-Flop," 12th NASA Symposium on VLSI Design, Oct. 4-5, 2005, 5 pages.
Gadlage, M. et al., "Single Event Transient Pulsewidths in Digital Microcircuits," IEEE Transactions on Nuclear Science, vol. 51, Issue. 6, pp. 3285-3290 (2004).

Hansen, D. et al., "Clock, Flip-Flop, and Combinatorial Logic Contributions to the SEU Cross Section in 90 nm ASIC Technology," IEEE Transactions on Nuclear Science, vol. 56, Issue 6, pp. 3542-3550 (2009).
Hindman, N. D. et al., "Fully Automated, Testable Design of Fine-Grained Triple Mode Redundant Logic," IEEE Transactions on Nuclear Science, vol. 58, Issue 6, pp. 3046-3052 (2011).
Hoang, T. et al., "A Radiation Hardened 16-Mb SRAM for Space Applications," IEEE Aerospace Conference, Mar. 3-10, 2007, pp. 1-6.
Knudsen, J., et al., "An Area and Power Efficient Radiation Hardened by Design Flip-Flop," IEEE Transactions on Nuclear Science, vol. 53, No. 6, Dec. 2006, pp. 3392-3399.
Kobayashi, D. et al., "Analytical Expression for Temporal Width Characterization of Radiation-Induced Pulse Noises in SOI CMOS Logic Gates," IEEE IRPS, pp. 165-169 (2009).
Lacoe, R. et al., "Application of Hardness-By-Design Methodology to Radiation-Tolerant ASIC Technologies," IEEE Transactions on Nuclear Science, vol. 47, No. 6, Dec. 2000, pp. 2334-2341.
Matush, B. et al., "Area-Efficient Temporally Hardened by Design Flip-Flop Circuits," IEEE Transactions on Nuclear Science, vol. 57, No. 6, Dec. 2010, pp. 3588-3595.
Mavis, D. G. et al., "Soft Error Rate Mitigation Techniques for Modern Microcircuits," 40th Annual International Reliability Physics Symposium, pp. 216-225, (2002).
Morgan, K. S. et al., "A Comparison of TMR with Alternative Fault-Tolerant Design Techniques for FPGAs," IEEE Transactions on Nuclear Science, vol. 54, No. 6, Dec. 2007, pp. 2065-2072.
Quinn, H. et al., "A Review of Xilinx FPGA Architectural Reliability Concerns from Virtex to Virtex-5," Radiation and Its Effects on Components and Systems (RADECS), Sep. 2007, 8 pages.
Ricci, F. et al., "A 1.5 GHz 90 nm Embedded Microprocessor Core," 2005 Symposium on VLSI Circuits Digest of Technical Papers, pp. 12-15 (2005).
Sexton, F.W. et al., "SEU Simulation and Testing of Resistor-Hardened D-latches in the SA3300 Microprocessor," IEEE Transactions on Nuclear Science, vol. 38, Issue 6, pp. 1521-1528, (1991).
Shambhulingaiah, S. et al., "Temporal Sequential Logic Hardening by Design with a Low Power Delay Element," RADECS 2011 Proceedings, pp. 144-149, (2011).
Shuler, R. et al., "Comparison of Dual-Rail and TMR Logic Cost Effectiveness and Suitability for FPGAs with Reconfigurable SEU Tolerance," IEEE Transactions on Nuclear Science, vol. 56, Issue 1, pp. 214-219 (2009).
Tipton, A. D. et al., "Device-Orientation Effects on Multiple-Bit Upset in 65 nm SRAMs," IEEE Transactions on Nuclear Science, vol. 55, Issue 6, pp. 2880-2885 (2008).
Turowski, M. et al., "Mixed-Mode Simulation and Analysis of Digital Single Event Transients in Fast CMOS ICs," 14th International Conference of Mixed Design, Jun. 21-23, 2007, pp. 433-438.
Warren, K. et al., "Heavy Ion Testing and Single Event Upset Rate Prediction Considerations for a DICE Flip-Flop," IEEE Transactions on Nuclear Science, vol. 56, Issue 6, pp. 3130-3137 (2009).
Non-Final Office Action for U.S. Appl. No. 13/487,859, mailed Sep. 6, 2013, 17 pages.
Notice of Allowance for U.S. Appl. No. 13/487,859, mailed Mar. 20, 2014, 13 pages.
Quayle Action for U.S. Appl. No. 14/304,155, mailed Nov. 28, 2014, 7 pages.
Notice of Allowance for U.S. Appl. No. 14/062,127, mailed Dec. 2, 2014, 11 pages.
Notice of Allowance for U.S. Appl. No. 14/304,155, mailed Feb. 23, 2015, 9 pages.

* cited by examiner

SEQUENTIAL STATE ELEMENTS RADIATION HARDENED BY DESIGN

RELATED APPLICATIONS

This application claims the benefit of U.S. Provisional Patent Application Ser. No. 61/702,903 filed on Sep. 19, 2012, and U.S. Provisional Patent Application Ser. No. 61/705,849 filed on Sep. 26, 2012, the disclosures of which are hereby incorporated herein by reference in their entireties.

FIELD OF THE DISCLOSURE

This application relates generally to sequential state elements (SSEs).

BACKGROUND

State machines built from integrated circuits on semiconductor substrates need to be radioactively hardened to prevent soft error events that occur when a high energy ionizing radiation particle travels through the semiconductor substrate. This is particularly true if the state machine is to operate in high radiation environments such as outer space. An ionizing particle traveling through the semiconductor substrate may cause a transient voltage glitch, i.e., a single event transient (SET), that may be captured by a sequential state storage element or may cause a sequential state element (SSE) to transition to an erroneous state, i.e., a single event upset (SEU) when in the feedback mode.

One technique for ameliorating the effects of high energy radiation is to provide hardening elements and/or redundancy in the SSE. Hardening elements either correct, or operate to allow the SSE to correct upsets, or prevent the SSE from transitioning erroneously, due to radiation strikes. For example, hardening elements can require agreement between redundant bit signals, isolate critical nodes from one another, and/or delay error propagation, thereby allowing the SSE to make corrections or not to transition to an erroneous state. To provide an example of hardening through redundancy, some SSEs employ Dual Interlocked Cells (DICE) with multiple interlocked nodes so that a radiation strike on any one of the interlocked nodes is corrected using the other interlocked node or nodes. However, charge collection can affect multiple nodes and the SSE may not be capable of correcting errors if certain combinations of nodes are upset simultaneously. For example, SSEs are often not capable of correcting errors when a radiation strike upsets charge collection nodes coupled to inputs of a hardening element and charge collection nodes coupled to outputs of the hardening element simultaneously. Similarly, DICE may not be capable of correcting an error if the radiation strike upsets more than one of the multiple interlocked nodes simultaneously.

To prevent one ionizing track from upsetting these critical node combinations, the charge collection nodes in these critical node combinations require a minimum amount of spatial separation. Often, this minimum amount of spatial separation is provided through size increases in the SSE. Unfortunately, size increases are expensive and becoming less practical as integrated circuits (ICs) continue to become more compact. It is thus desirable that the size of the SSE be kept at a minimum, while still providing the minimum amount of spacing between critical node combinations.

SUMMARY

This disclosure relates generally to sequential state elements (SSEs). More specifically, embodiments of flip-flops are disclosed, along with computerized methods and systems of designing the same. In one embodiment, the flip-flop includes a substrate and subcircuits that are formed on the substrate. The subcircuits provide subfunctions, wherein each of the subcircuits provides at least one of the subfunctions. More specifically, the subfunctions are provided in a sequential logical order by the subcircuits so that the flip-flop provides a flip-flop function. However, the subcircuits are interleaved out of the sequential logical order with respect to a corresponding subfunction provided by each of the subcircuits along a vector defined by the substrate. In this manner, interleaving the subcircuits along the vector of the substrate can provide separation between charge collection nodes without requiring increases in size. Thus, the flip-flop can be more compact and less expensive to manufacture.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

This disclosure relates generally to systems, devices, and methods related to state machines and sequential state elements for the state machines. State machines are generally formed as integrated circuits (ICs) within a semiconductor substrate. The state machines are synchronized by one or more clock signals to pass and receive bit states. In its simplest form, the state machine may include a single combinational logic element and a single sequential state element (SSE) coupled to the combinational logic element. The SSE receives an input bit signal and generates an output bit signal. An output bit state of the output bit signal is based on an input bit state of the input bit signal, and the bit states are passed by the SSE in accordance with the clock signal(s). The combinational logic element either receives the output bit signal from the SSE or provides an input bit signal to the SSE. In either case, the passing of the bit states to or from the combinational logic element is synchronized by the clock signal(s).

The state machine may be more complex and may be configured as a pipeline circuit having multiple pipeline stages. The pipeline stages are coupled sequentially, and each pipeline stage may include a combinational circuit (which itself may be comprised of many gates or devices) and sequential state holding circuits. Thus, the state machine may be any type of pipelined digital circuit or a portion thereof. For example, the state machine may be a microprocessor, or any portion of a microprocessor, such as an arithmetic logic unit (ALU), a register file, instruction memory, data memory, and/or the like.

Figure 1:
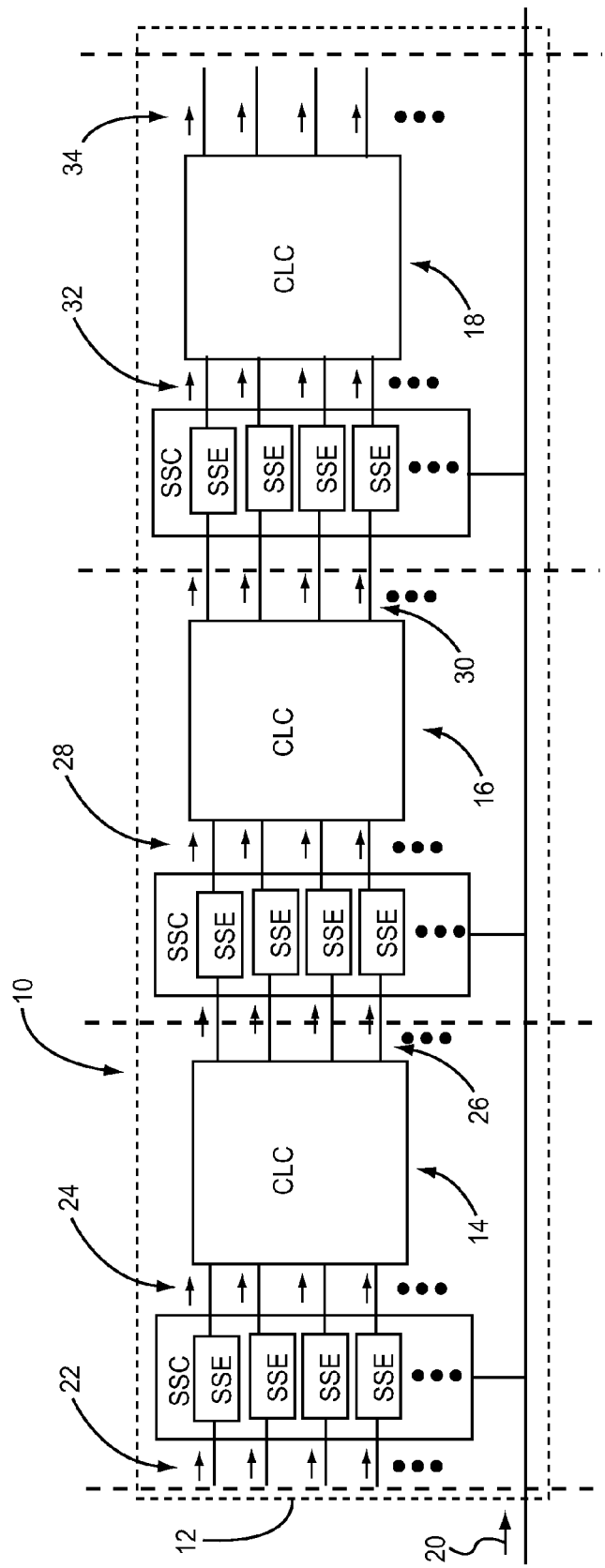
FIG. 1 is a block diagram of one embodiment of a radiation hardened state machine (RHSM).

FIG. 1 illustrates a block diagram of one embodiment of a radiation hardened state machine (RHSM) 10. The RHSM 10 includes a pipeline circuit 12. The pipeline circuit 12 is a finite state machine that has been radiation hardened. The operation of the finite state machine provided by the pipeline circuit 12 may be loosely analogized to an assembly line. More specifically, of the pipeline circuit 12 has pipeline stages 14, 16, and 18. In the pipeline circuit 12, the different pipeline stages 14, 16, 18 handle a different operation of the finite state machine so that the various operations of the finite state machine are handled essentially in series. Examples of operations that may be provided by the different pipeline stages 14, 16, 18 for the finite state machine include instruction fetch operations, instruction decode operations, encode operations, register file operations, fetch operations, instruction execution operations, data memory access operations, register file write back operations, and/or the like. As shown in FIG. 1, each of the pipeline stages 14, 16, 18 in the pipeline circuit 12 includes a different combinational logic circuit (CLC) and a different sequential state circuit (SSC). In the pipeline circuit 12, the CLCs of the different pipeline stages 14, 16, 18 are specialized to handle the particular operation of the pipeline stage 14, 16, 18. Accordingly, for each of the pipeline stages 14, 16, 18 in the pipeline circuit 12, the CLCs include an arrangement of combinational logic elements (i.e., logic gates) configured to provide logic that implements the operation of the pipeline stage 14, 16, 18. For example, static combinational elements and/or dynamic combinational elements may be utilized. While the pipeline circuit 12 shown in FIG. 1 has three pipeline stages 14, 16, 18, it should be noted that alternative embodiments of the RHSM 10 may include any number of pipeline stages. Additionally, feedback may exist between any of the pipeline stages. This may depend on the particular finite state machine to be provided for the particular application.

To synchronize the pipeline stages 14, 16, 18 of the pipeline circuit 12, the SSCs coordinate transfer of valid states between the different pipeline stages 14, 16, 18 in accordance with a clock signal 20. More specifically, the clock signal 20 is received by the pipeline circuit 12. In this particular embodiment, the pipeline circuit 12 is assumed to be arranged in a single-phase clock style so that each of the SSCs in the different pipeline stages 14, 16, 18 receives the same clock signal 20. Alternatively, multiple-phase clock styles may be used. This may depend, for example, on the particular clock distribution technique used for the RHSM 10. When multiple-phase clock styles are implemented, each of the SSCs in the different pipeline stages 14, 16, 18 may receive a different clock signal within each of the pipeline circuits 12. Additionally, when the CLCs are implemented using dynamic combinational elements, coordination of precharging may be coordinated by different clock signals if desired.

The SSC in the pipeline stage 14 receives a data input 22. Based on the data input 22 and in accordance with the clock signal 20, the SSC in the pipeline stage 14 of the pipeline circuit 12 generates a data output 24. In this embodiment, the data input 22 for the pipeline stage 14 includes a plurality of input bit signals that provide the various bits of the data input 22. Accordingly, the data output 24 from the SSC of the pipeline stage 14 includes a plurality of output bit signals that provide the various bits of the data output 24. Multiple SSEs are thus included in the SSC of the pipeline stage 14.

The CLC of the pipeline stage 14 performs a designated pipeline operation in accordance with its logical arrangement to generate a data input 26 for the next pipeline stage 16.

It should be noted that the data input 22 may have any number of input bit signals, depending on a data type. The data input 26 may also have any number of input bit signals, depending on the data type. However, the data input 22 and the data input 26 may have different numbers of input bit signals, since the data types of the data input 22 and the data input 26 may be different. To illustrate one non-limiting example, if the pipeline stage 14 provides a decoding operation, the number of input bit signals in the data input 22 would be greater than the number of input bit signals in the data input 26. In another non-limiting example, if the pipeline stage 14 provides an encoding operation, the number of input bit signals in the data input 22 would be less than the number of input bit signals in the data input 26.

The SSC in the pipeline stage 16 receives the data input 26 from the previous pipeline stage 14. Based on the data input 26 and in accordance with the clock signal 20, the SSC in the pipeline stage 16 generates a data output 28. As mentioned above, the data input 26 for the pipeline stage 16 includes a plurality of input bit signals that provide the various bits of the data input 26. Accordingly, the data output 28 from the SSC of the pipeline stage 16 includes a plurality of output bit signals that provide the various bits of the data output 28. Multiple SSEs are thus included in the SSC of the pipeline stage 16. More specifically, the SSC in the pipeline stage 16 provides an SSE to receive each input bit signal in the data input 26 and to generate each output bit signal in the data output 28.

The CLC of the pipeline stage 16 performs the designated pipeline operation in accordance with its logical arrangement to generate a data input 30 for the next pipeline stage 18. The data input 26 and the data input 30 may or may not have different numbers of input bit signals, depending on their data types.

The SSC in the pipeline stage 18 receives the data input 30 from the previous pipeline stage 16. Based on the data input 30 and in accordance with the clock signal 20, the SSC in the pipeline stage 18 generates a data output 32. In FIG. 1, the data input 30 for the pipeline stage 18 includes a plurality of input bit signals that provide the various bits of the data input 30. Accordingly, the data output 32 from the SSC of the pipeline stage 18 includes a plurality of output bit signals that provide the various bits of the data output 32. Multiple SSEs are thus included in the SSC of the pipeline stage 18. More specifically, the SSC in the pipeline stage 18 provides an SSE to receive each input bit signal in the data input 30 and to generate each output bit signal in the data output 32. The CLC of the pipeline stage 18 performs a designated pipeline operation in accordance with its logical arrangement to generate a data input 34. The data input 30 and the data input 34 may or may not have different numbers of input bit signals, depending on their data types.

As mentioned above, different embodiments of the RHSM 10 may have any number of pipeline stages. For instance, the data input 34 may be transmitted externally to one or more external devices or may be provided to pipeline stages downstream from the pipeline stage 18. Similarly, the data input 22 for the pipeline stage 14 may be received from external devices or may be received from upstream pipeline stages. In fact, any design for a finite state machine may be used as a design for an embodiment of the RHSM 10.

Figure 2:
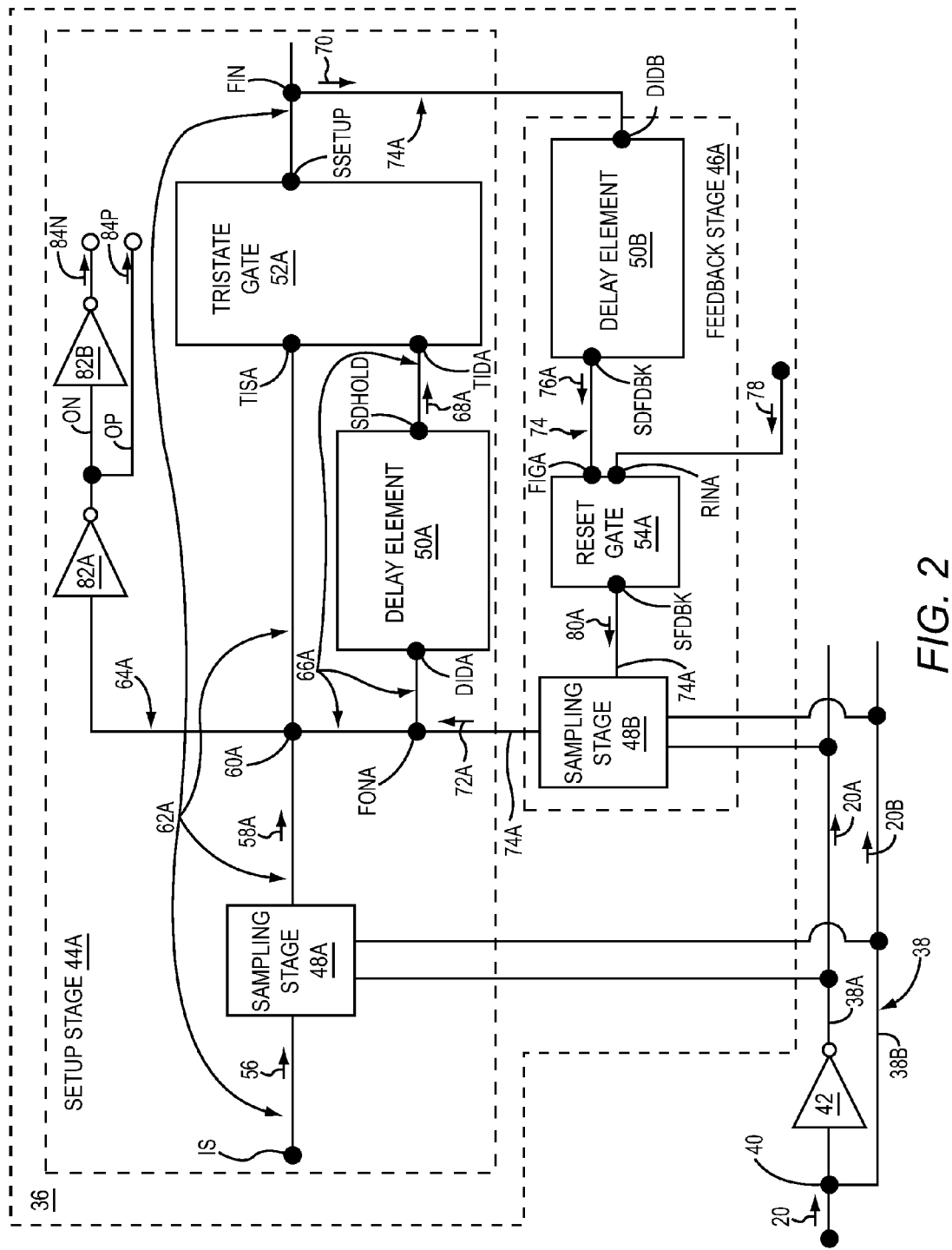
FIG. 2 is a block diagram of an exemplary sequential state element (SSE), which in this embodiment is a latch.

Referring now to FIG. 2, FIG. 2 illustrates a block diagram of an exemplary SSE. The general purpose of the SSEs is to hold bit states for processing by the CLCs while preventing subsequent bit states from entering the CLCs too soon. In FIG. 2, the SSE is a latch 36. Embodiments of the latch 36 may be provided as one or more of the SSEs within the SSCs shown in FIG. 1. Other types of SSEs that may be provided within the SSCs include flip-flops and bistables.

The latch 36 shown in FIG. 2 is synchronizable in accordance with the clock signal 20, which oscillates between a first clock state and a second clock state. The amount of time it takes the clock signal 20 to oscillate once between the first clock state and the second clock state is generally referred to as a clock cycle. The latch 36 is configured to receive the clock signal 20, which coordinates the operation of the latch 36. In this example, a clock signal path 38 branches at a node 40 into two clock branches 38A and 38B. An inverter 42 is provided in the clock branch 38A. The inverter 42 is operable to invert the clock signal 20 within the clock branch 38A. No inverter has been provided in the clock branch 38B. Accordingly, the clock signal 20 is received by the latch 36 as a differential clock signal having a negative side clock signal 20A transmitted on the clock branch 38A, while a positive side clock signal 20B is provided in the clock branch 38B.

The latch 36 has a setup stage 44A, a feedback stage 46A, sampling stages (referred to generically as elements 48 and specifically as elements 48A, 48B), delay elements (referred to generically as elements 50 and specifically as elements 50A, 50B), a tristate gate 52A, and a reset gate 54A. More specifically, the setup stage 44A includes the sampling stage 48A, the delay element 50A, and the tristate gate 52A, while the feedback stage 46A includes the sampling stage 48B, the delay element 50B, and the reset gate 54A. Both the setup stage 44A and the feedback stage 46A receive the clock signal 20 (as the negative side clock signal 20A and the positive side clock signal 20B) from the clock signal path 38. More specifically, the sampling stage 48A in the setup stage 44A receives the clock signal 20 (as the negative side clock signal 20A and the positive side clock signal 20B) and the sampling stage 48B in the feedback stage 46A receives the clock signal 20 (as the negative side clock signal 20A and the positive side clock signal 20B).

With regard to the setup stage 44A, the setup stage 44A is activated when the clock signal 20 is in the first clock state. The sampling stage 48A receives an input bit signal 56 having an input bit state. For example, the input bit state could be in a higher voltage state to represent a logical "1." On the other hand, the input bit state could be in a lower voltage state to represent a logical "0." While the clock signal 20 is in the first clock state, the sampling stage 48A is configured to sample the input bit signal 56 and generate an output bit signal 58A having an output bit state provided in accordance with the input bit state of the input bit signal 56. In other words, the latch 36 is transparent while the clock signal 20 is in the first clock state. Depending on the embodiment of the sampling stage 48A, the sampling stage 48A may be configured to generate the output bit signal 58A so that the output bit state is the same as the input bit state of the input bit signal 56, or inverted with respect to the input bit state of the input bit signal 56. In this example, the output bit state of the output bit signal 58A is inverted with respect to the input bit state of the input bit signal 56. While the clock signal 20 is in the first clock state, the output bit signal 58A is received at a storage node 60A with the output bit state as provided by the sampling stage 48A while the sampling stage 48A is transparent.

The setup stage 44A includes a setup path 62A that begins at an input node IS to receive the input bit signal 56 and continues to the storage node 60A. The setup path 62A then continues along a main branch to the tristate gate 52A, but also includes two other branches. These other branches of the setup path 62A are an output path 64A and a delay path 66A. The sampling stage 48A is coupled within the setup path 62A (i.e., the main branch of the setup path 62A) between the input node IS and the storage node 60A so that the sampling stage 48A receives the input bit signal 56 from the input node IS. The output path 64A and the delay path 66A both branch out from the main branch of the setup path 62A between the sampling stage 48A and the tristate gate 52A. In this example, the output path 64A and the delay path 66A both branch out from the main branch of the setup path 62A at the storage node 60A.

With regard to the setup path 62A, the tristate gate 52A is configured to receive the output bit signal 58A from the sampling stage 48A. In this embodiment, the tristate gate 52A is configured to receive the output bit signal 58A from the storage node 60A along the main branch of the setup path 62A. The tristate gate 52A is coupled to the storage node 60A to receive the output bit signal 58A at a node TISA, which is an input of the tristate gate 52A in the main branch of the setup path 62A. As explained in further detail below, a node SSETUP of the tristate gate 52A is also provided in the main branch of the setup path 62A. The node SSETUP is an output of the tristate gate 52A.

With regard to the delay path 66A provided as one of the branches of the setup path 62A, the delay element 50A is also configured to receive the output bit signal 58A from the sampling stage 48A. More specifically, the delay element 50A is coupled to the storage node 60A to receive the output bit signal 58A at a node DIDA in the delay path 66A. The node DIDA thus is an input of the delay element 50A. In this embodiment, the delay element 50A is provided within the delay path 66A. The delay element 50A is configured to generate an output bit signal 68A having an output bit state provided in accordance with the output bit state of the output bit signal 58A but delayed in time (a time that is considerable compared to the standard gate delay on a given process). The output bit signal 68A is provided at a node SDHOLD in the delay path 66A. Thus, the node SDHOLD is an output of the delay element 50A for transmitting the output bit signal 68A. The output bit signal 68A then propagates along the delay path 66A to a node TIDA of the tristate gate 52A. The node TIDA is also in the delay path 66A and is another input to the tristate gate 52A. Thus, the tristate gate 52A has the nodes TISA and TIDA in different branches (i.e., the main branch of the setup path 62A and the delay path 66A, respectively) of the setup path 62A. Accordingly, the delay element 50A is coupled within the delay path 66A between the storage node 60A and the input node TIDA of the tristate gate 52A.

The tristate gate 52A is configured to generate a feedback input bit signal 70 having a feedback bit state at the node SSETUP. The tristate gate 52A is configured to set the feedback bit state in accordance with the output bit state of the output bit signal 58A and the output bit state of the output bit signal 68A when the output bit state of the output bit signal 58A and the output bit state of the output bit signal 68A are equal. However, when the output bit state of the output bit signal 58A and the output bit state of the output bit signal 68A are unequal, the tristate gate 52A is configured to tristate, and thus the feedback bit state remains unchanged and is not set in accordance with the output bit state of the output bit signal 58A and the output bit state of the output bit signal 68A. For example, the tristate gate 52A may be a tristate inverter gate. The tristate gate 52A is configured as a Muller C-element, i.e., by configuring the input to TISA and both the NMOS and PMOS tri-state enables, ENABLE and ENABLEN, respectively, to TIDA. As such, the tristate gate 52A is configured to set the feedback bit state opposite the output bit state of the output bit signal 58A and the output bit state of the output bit signal 68A in response to the output bit state of the output bit signal 58A and the output bit state of the output bit signal 58A being equal. Also, the tristate gate 52A is configured to maintain the feedback bit state unchanged (hold) in response to the output bit state of the output bit signal 58A and the output bit state of the output bit signal 68A being unequal. The feedback input bit signal 70 propagates along the setup path 62A from the node SSETUP and is received by the feedback stage 46A at a node FIN.

Once the clock signal 20 switches to the second clock state, the feedback stage 46A is activated and the latch 36 is closed. In other words, the sampling stage 48A becomes opaque and changes in the first input bit state do not affect the output bit state of the output bit signal 58A. While the clock signal 20 is in the second clock state, the feedback stage 46A is configured to drive the output bit state of the output bit signal 58A such that the output bit state of the output bit signal 58A is held at the storage node 60A as provided by the sampling stage 48A. For example, if the output bit state was provided from the sampling stage 48A to represent a logical "1," the feedback stage 46A drives the output bit signal 58A at the storage node 60A to maintain the output bit signal 58A as representing a logical "1." On the other hand, if the output bit state was provided from the sampling stage 48A to represent a logical "0," the feedback stage 46A drives the output bit signal 58A at the storage node 60A to maintain the output bit signal 58A as representing a logical "0."

In this embodiment, the tristate gate 52A generates the feedback input bit signal 70 with a feedback bit state that is inverted with respect to the output bit state of the output bit signal 58A and the output bit state of the output bit signal 68A. Accordingly, when the output bit state of the output bit signal 58A and the output bit state of the output bit signal 68A are each a logical "1," the feedback bit state of the feedback input bit signal 70 is a logical "0." In contrast, when the output bit state of the output bit signal 58A and the output bit state of the output bit signal 68A are each a logical "0," the feedback bit state of the feedback input bit signal 70 is a logical "1." However, when the output bit state of the output bit signal 58A and the output bit state of the output bit signal 68A are unequal, the feedback bit state is maintained unchanged. Thus, if the feedback bit state was previously a logical "1," the feedback bit state is maintained as a logical "1" regardless of the output bit state of the output bit signal 58A and the output bit state of the output bit signal 68A, and if the feedback bit state was previously a logical "0," the feedback bit state is maintained as a logical "0" regardless of the output bit state of the output bit signal 58A and the output bit state of the output bit signal 68A. However, if the input change of the output bit signal 58A is maintained for sufficient duration at the node SDHOLD (and the feedback sampling signal 80A in the feedback mode), the feedback input bit signal 70 of the tristate gate 52A will transition.

To provide an exemplary explanation of correction by the feedback stage 46A when the feedback stage 46A is transparent, the latch 36 is again assumed to be one of the SSEs in the SSC of the pipeline stage 16 shown in FIG. 1, as explained above. Thus, if the output bit state of the output bit signal 58A and the output bit state of the output bit signal 68A are opposite, it can be presumed that an error has occurred in the pipeline circuit 12. For instance, perhaps a radiation strike in the setup path 62A of the pipeline stage 14 caused a change of the output bit state of the output bit signal 68A at the storage node 60A. As a result, an erroneous bit state is provided to the tristate gate 52A at the node TISA. However, the output bit state of the output bit signal 58A and the output bit state of the output bit signal 68A will then be opposite, and the feedback bit state of the feedback input bit signal 70 will be maintained unchanged. The feedback stage 46A would thus drive the output bit state of the output bit signal 58A when the clock signal 20 is in the second clock state to correct the erroneous bit state. As shown in FIG. 2, the feedback stage 46A is configured to generate a feedback output bit signal 72A to drive the output bit state of the output bit signal 58A. Consequently, the feedback stage 46A reinforces the output bit state of the output bit signal 58A at the storage node 60A while the feedback stage 46A is transparent.

In this regard, the feedback stage 46A is transparent when the clock signal 20 is in the second clock state. The feedback input bit signal 70 propagates from the node SSETUP in the setup path 62A to the node FIN. The feedback stage 46A defines a feedback path 74A that begins at the node FIN where the feedback stage 46A receives the feedback input bit signal 70 and the main branch of the setup path 62A ends.

With regard to the feedback path 74A, the delay element 50B is configured to receive the feedback input bit signal 70 from the tristate gate 52A. More specifically, the delay element 50B is coupled to the node FIN to receive the feedback input bit signal 70 at a node DIDB. In this embodiment, the delay element 50B is provided within the feedback path 74A and the node DIDB is an input of the delay element 50B in the feedback path 74A. The delay element 50B is configured to generate an output bit signal 76A having a output bit state provided in accordance with the feedback input bit state of the feedback input bit signal 70. The output bit signal 76A is provided at a node SDFDBK in the feedback path 74A. The output bit signal 76A is then propagated along the feedback path 74A from the node SDFDBK of the delay element 50B to a node FIGA of the reset gate 54A, where the node FIGA is an input of the reset gate 54A. The node SDFDBK and the node FIGA are both also in the feedback path 74A. Accordingly, the delay element 50B is coupled within the feedback path 74A between the node FIN and the node FIGA of the reset gate 54A.

The reset gate 54A is configured to receive the output bit signal 76A from the delay element 50B. More specifically, the reset gate 54A is coupled to the node SDFDBK of the delay element 50B to receive the output bit signal 76A at the node FIGA. The reset gate 54A is also coupled to receive a reset signal 78 at a reset input node RINA. The reset gate 54A is configured to generate a feedback sampling signal 80A having a feedback sampling signal state. As long as the reset signal 78 is in a non-reset signal state, the reset gate 54A is configured to set the feedback sampling signal state in accordance with the output bit state of the output bit signal 76A. When the reset signal 78 is in a reset signal state, the reset gate 54A is configured to set the feedback sampling signal state to a predetermined reset signal state. Alternatively, with regard to a nonresettable latch, the reset gate 54A may be replaced by an inverter or may be omitted along with another inverting component in the feedback stage 46A.

The sampling stage 48B receives the feedback sampling signal 80A from a node SFDBK of the reset gate 54A, wherein the node SFDBK is in the feedback path 74A and is an output of the reset gate 54A. While the sampling stage 48B is transparent, the sampling stage 48B is configured to sample the feedback sampling signal 80A and generate the feedback output bit signal 72A having the output bit state provided in accordance with the feedback sampling bit state. In this embodiment, the feedback stage 46A and the sampling stage 48B are transparent while the clock signal 20 is in the second clock state and also while the setup stage 44A is opaque. Depending on the embodiment of the sampling stage 48B, the sampling stage 48B may be configured to generate the feedback output bit signal 72A so that the feedback output bit state is the same as the feedback sampling bit state, or so that the feedback output bit state is inverted with respect to the feedback sampling bit state.

In this example, the feedback output bit state is the same as the feedback sampling bit state. It should be noted, however, that the tristate gate 52A in this embodiment is a tristate inverter gate, as mentioned above. The feedback output bit signal 72A then propagates along the feedback path 74A to a node FONA. The node FONA is directly connected to the storage node 60A. Thus, the feedback output bit signal 72A holds the output bit state of the output bit signal 58A until the sampling stage 48A becomes transparent again. When the clock signal 20 goes back to the first clock state, the feedback stage 46A becomes opaque and a new output bit state of the output bit signal 58A is set up by the setup stage 44A.

The delay elements 50 may each be configured to have a propagation delay longer than a maximum single event transient (SET) duration. In this manner, the delay element 50A operates such that the tristate gate 52A corrects upsets in the latch 36 resulting from a single event upset (SEU) and a resulting SET. As such, the delay element 50A and the tristate gate 52A are hardening components. More specifically, the latch 36 is temporally hardened by the delay elements 50 and the tristate gate 52A.

The maximum SET duration may be determined empirically or analytically and used to configure the delay elements 50 with the desired propagation delays. Of course, the maximum SET duration may not be a deterministic value, since maximums regarding the energy and temporal length of a radiation strike can be inherently stochastic and may not be known in any absolute sense. Nevertheless, the maximum SET duration can be determined within an acceptable error range, which can be measured based on materials, electrical characteristics, topology, the intended application, and/or performance parameters for an SSE.

Note that the tristate gate 52A prevents uncorrectable errors by capacitively holding at the node SSETUP (i.e., not driving the node SSETUP) if the output bit state of the output bit signal 58A and the output bit state of the output bit signal 68A are unequal. As such, the delay element 50A allows for errors in the output bit state of the output bit signal 58A (and also errors in the output bit state of the output bit signal 68A) to be corrected by the latch 36. For example, if an error in the output bit state of the output bit signal 58A occurs due to an upset, the output bit state of the output bit signal 58A will be incorrect at the node TISA of the tristate gate 52A and the node DIDA of the delay element 50A for a duration of the upset.

However, the propagation delay of the delay element 50A allows for the output bit state of the output bit signal 58A to be corrected before the error in the output bit state of the output bit signal 58A results in an error in the output bit state of the output bit signal 68A at the node SDHOLD of the delay element 50A. For instance, if the setup stage 44A is transparent, the input bit signal 56 corrects the output bit state of the output bit signal 58A before the error in the output bit state of the output bit signal 68A reaches the node TIDA of the tristate gate 52A. On the other hand, if the feedback stage 46A is transparent, the feedback output bit state of the feedback output bit signal 72A corrects the output bit state of the output bit signal 58A before the error in the output bit state of the output bit signal 68A reaches the node TIDA of the tristate gate 52A.

Consequently, the error in the output bit state of the output bit signal 58A and the error in the output bit state of the output bit signal 68A are not provided at the nodes TISA, TIDA of the tristate gate 52A simultaneously, but rather are temporally separated. As such, during the error in the output bit state of the output bit signal 58A and during the error in the output bit state of the output bit signal 68A, the tristate gate 52A holds and maintains the feedback input bit state of the feedback input bit signal 70 correctly. Once the output bit state of the output bit signal 58A is corrected, the output bit signal 58A causes the output bit state of the output bit signal 68A to be corrected.

From this, it is easy to understand why simultaneously upsetting the storage node 60A and the node SDHOLD should be prevented. More specifically, simultaneously upsetting the storage node 60A and the node SDHOLD would result in an error in the output bit state of the output bit signal 58A and an error in the output bit state of the output bit signal 68A simultaneously at nodes TISA, TIDA of the tristate gate 52A. The storage node 60A and the node SDHOLD are thus a combination of nodes that results in an uncorrectable error if upset simultaneously.

With regard to an error in the feedback input bit state of the feedback input bit signal 70 at the node SSETUP, the output bit state of the output bit signal 58A and the output bit state of the output bit signal 68A are maintained correctly if the feedback stage 46A is opaque. As such, the feedback input bit state of the feedback input bit signal 70 wouldn't be able to affect the output bit state of the output bit signal 58A and the output bit state of the output bit signal 68A. Thus, the tristate gate 52A is configured to correct the error in the feedback input bit state of the feedback input bit signal 70, since the output bit state of the output bit signal 58A and the output bit state of the output bit signal 68A are not affected by the error in the feedback input bit state of the feedback input bit signal 70.

However, this may not be the case if the delay element 50B is not provided in the feedback path 74A while the feedback stage 46A is transparent. More specifically, the delay element 50B is configured to allow for errors in the bit state of the feedback input bit signal 70 to be corrected by the latch 36 while the feedback stage 46A is transparent (where the latch 36 is in feedback mode, commonly referred to as the latch 36 being opaque rather than transparent to signals at the input node IS). To clarify, consider what could happen if the delay element 50B were not provided when the feedback stage 46A is transparent and during a SET at the node SSETUP. If an error in the feedback input bit state of the feedback input bit signal 70 occurs due to an upset (and assuming that the recovery delay of the tristate gate 52A is longer than a propagation delay of the feedback stage 46A if the delay element 50B were removed), the error in the feedback input bit state of the feedback input bit signal 70 would result in an error in the feedback output bit state of the feedback output bit signal 72A before the tristate gate 52A was able to correct the error in the feedback input bit state of the feedback input bit signal 70. As such, the tristate gate 52A would hold the error (i.e., tri-state) in the feedback input bit state of the feedback input bit signal 70 (rather than correct the error in the feedback input bit state by actively driving it back to the correct logic state).

Now referring again to the feedback stage 46A as shown in FIG. 2, a propagation delay of the delay element 50B is longer than a maximum SET duration, and thus would also be longer than the recovery time of the tristate gate 52A. As such, the delay element 50B is configured to allow the tristate gate 52A to correct the error in the feedback input bit state of the feedback input bit signal 70 before the error in the feedback output bit state of the feedback output bit signal 72A is provided at the node FONA. Consequently, the error in the output bit state of the output bit signal 58A would be temporary (see discussion of the delay element 50A above) once the error in the feedback output bit state of the feedback output bit signal 72A is provided at the node FONA, because the feedback input bit state of the feedback input bit signal 70 would already have been corrected. Thus, the error in the feedback input bit state and the resulting error in the output bit state of the output bit signal 58A are correctable.

From this, it is easy to understand why simultaneously upsetting the storage node 60A and the node SSETUP should be prevented, since simultaneous errors in the output bit state of the output bit signal 58A and the feedback input bit state of the feedback input bit signal 70 would result in the tristate gate 52A holding the error in the feedback input bit state rather than correcting it while the error in the feedback input bit state was being delayed by the delay element 50B. Thus, the simultaneous errors in the feedback input bit state of the feedback input bit signal 70 and the output bit state of the output bit signal 58A would not be corrected. The storage node 60A and the node SSETUP are thus a combination of nodes that results in an uncorrectable error when upset simultaneously.

Referring again to the setup path 62A, the output path 64A includes an inverter 82A and an inverter 82B, an output branch OP, and an output branch ON. The inverter 82A is configured to receive the output bit signal 58A at the storage node 60A and generate a final inverted output bit signal 84P. This final inverted output bit signal 84P may be transmitted along the output branch OP. The inverter 82B is in the output branch ON and is configured to receive the final inverted output bit signal 84P and generate a final non-inverted output bit signal 84N. From the output branches OP, ON, either or both of the final inverted output bit signal 84P and the final non-inverted output bit signal 84N may be transmitted to a CLC of one of the pipeline stages 14, 16, 18 (shown in FIG. 1) as one of the bit signals of one of the data outputs 24, 28, 32. Due to the inversions by the inverter 82A and the inverter 82B, the final inverted output bit state is inverted with respect to the output bit state of the output bit signal 58A and the final non-inverted output bit state is not inverted with respect to the output bit state of the output bit signal 58A. When the sampling stage 48A is opaque, the final inverted output bit state and the final non-inverted output bit state are isolated from changes in the input bit state of the input bit signal 56. In essence, changes to the input bit state cannot enter the storage node 60A and affect the final inverted output bit state and the final non-inverted output bit state. However, once the clock signal 20 transitions back into the first clock state, the sampling stage 48A again becomes transparent. Thus, the input bit state of the input bit signal 56 can change the output bit state of the output bit signal 58A at the storage node 60A. In this manner, valid bit states are passed according to the timing of the clock signal 20.

Figure 3:
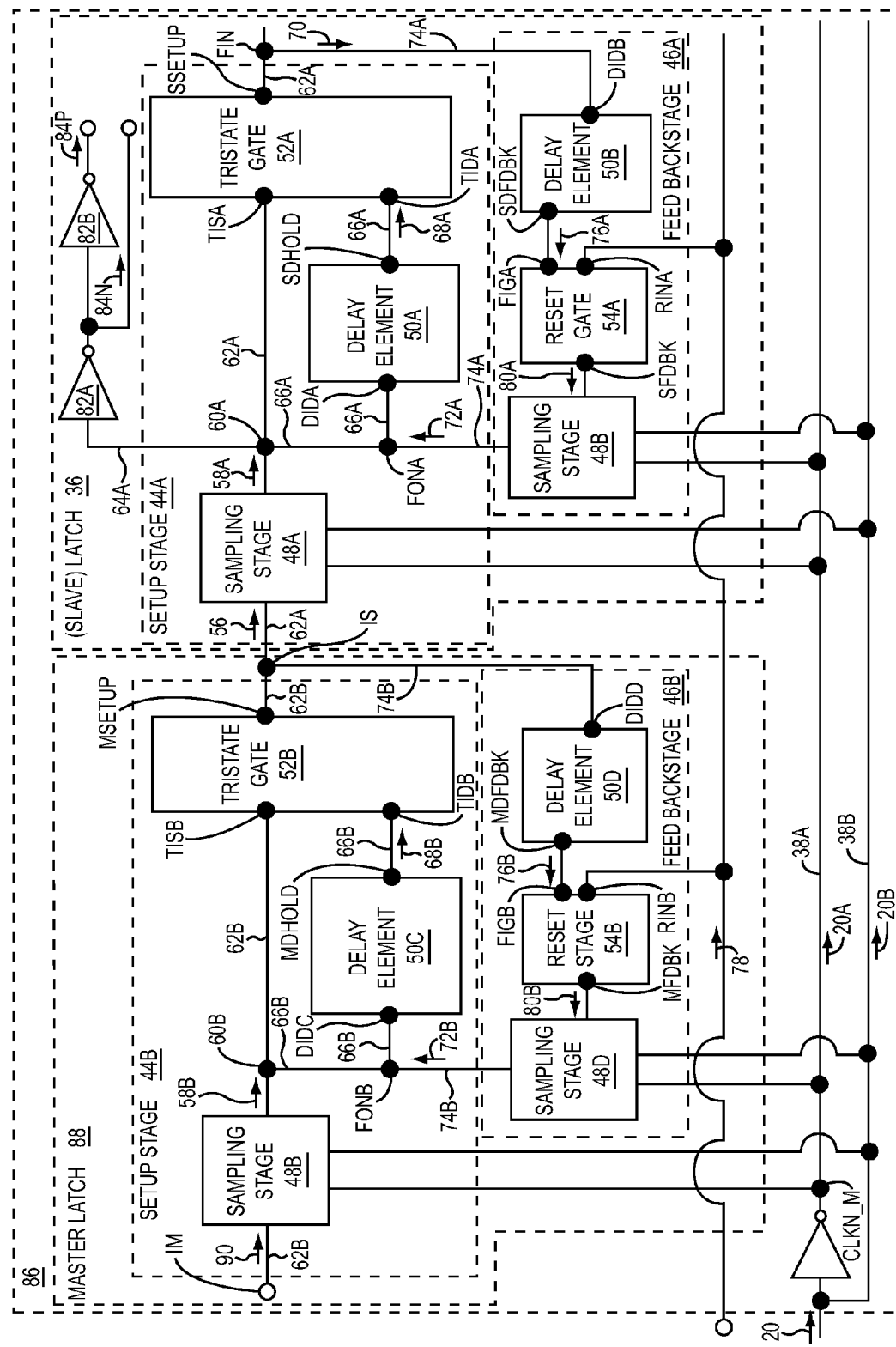
FIG. 3 is a block diagram illustrating another exemplary SSE, which in this embodiment is a flip-flop that includes a master latch and the latch shown in FIG. 2 as a slave latch.

FIG. 3 is a block diagram illustrating another exemplary SSE. The SSE shown in FIG. 3 illustrates one embodiment of a flip-flop 86. The flip-flop 86 has the same latch 36 described above with respect to FIG. 2. However, the flip-flop 86 also includes a master latch 88. The master latch 88 is coupled to the latch 36 so that the latch 36 is a slave latch. Like the latch 36, the master latch 88 has a setup stage 44B and a feedback stage 46B. The setup stage 44B of the master latch 88 is similar to the setup stage 44A of the latch 36. As such, a sampling stage 48C, a delay element 50C, a tristate gate 52B, an output bit signal 58B, a storage node 60B, a setup path 62B, a delay path 66B, an output bit signal 68B, and the input bit signal 56 each correspond to and operate in a similar manner to the sampling stage 48A, the delay element 50A, the tristate gate 52A, the output bit signal 58A, the storage node 60A, the setup path 62B, the delay path 66A, the output bit signal 68A, and the feedback input bit signal 70, respectively, in the latch 36. Thus, a node IM, the storage node 60B, a node DIDC, a node MDHOLD, a node TISB, a node TIDB, a node MSETUP, and the node IS of the master latch 88 correspond to the node IS, the storage node 60A, the node DIDA, the node SDHOLD, the node TISA, the node TIDA, the node SSETUP, and the node FIN, respectively, in the latch 36. However, in this embodiment, a sampling stage 48C is configured to sample an initial input bit signal 90 (rather than the input bit signal 56 for the latch 36) having an initial input bit state to generate the input bit signal 56 (rather than the feedback input bit signal 70 for the latch 36) while the clock signal 20 is in the second clock state (rather than the first clock state, as with the setup stage 44A of the latch 36). Thus, the master latch 88 and the setup stage 44B are transparent while the latch 36 (i.e., the slave latch) and the setup stage 44A are opaque, and vice versa. Note also that the master latch 88 does not include a version of the output path 64A of the latch 36.

The feedback stage 46B of the master latch 88 is also similar to the feedback stage 46A of the latch 36. As such, a sampling stage 48D, a delay element 50D, a reset gate 54B, the input bit signal 56, a feedback output bit signal 72B, and a feedback sampling signal 80B each correspond to and operate in a similar manner to the sampling stage 48B, the delay element 50B, the reset gate 54A, the feedback input bit signal 70, the feedback output bit signal 72A, the feedback sampling signal 80A, and the input bit signal 56, respectively, described above with respect to the latch 36. Thus, the node IS, a node DIDD, a node MDFDBK, a node FIGB, a node RINB, a node MFDBK, and a node FONB of the master latch 88 correspond to the node FIN, the node DIDB, the node SDFDBK, the node FIGA, the node RINA, the node SFDBK, and the node FONA, respectively, in the latch 36. However, in this embodiment, the delay element 50D is configured to receive the input bit signal 56 (rather than the feedback input bit signal 70 for the latch 36). Furthermore, the sampling stage 48D is configured to sample the feedback sampling signal 80B to generate the feedback output bit signal 72B while the clock signal 20 is in the first clock state (rather than the second clock state, as with the feedback stage 46A of the latch 36). Thus, the master latch 88 is transparent while the latch 36 (i.e., the slave latch) is opaque, and vice versa. Accordingly, the feedback stage 46B is configured to drive an output bit state of the output bit signal 58B such that the output bit state of the output bit signal 58B is held as provided from the sampling stage 48C while the clock signal 20 is in the first clock state. The master latch 88 thus deraces the path to the latch 36 so that hold time requirements for the latch 36 are more easily met. The flip-flop 86 thus holds two bit state values (i.e., the output bit state of the output bit signal 58A and the output bit state of the output bit signal 58B) during the second clock state. The delay element 50C and the delay element 50D provide temporal radiation hardening in the same manner described above with respect to the delay element 50A and the delay element 50B, respectively.

Figure 4A:
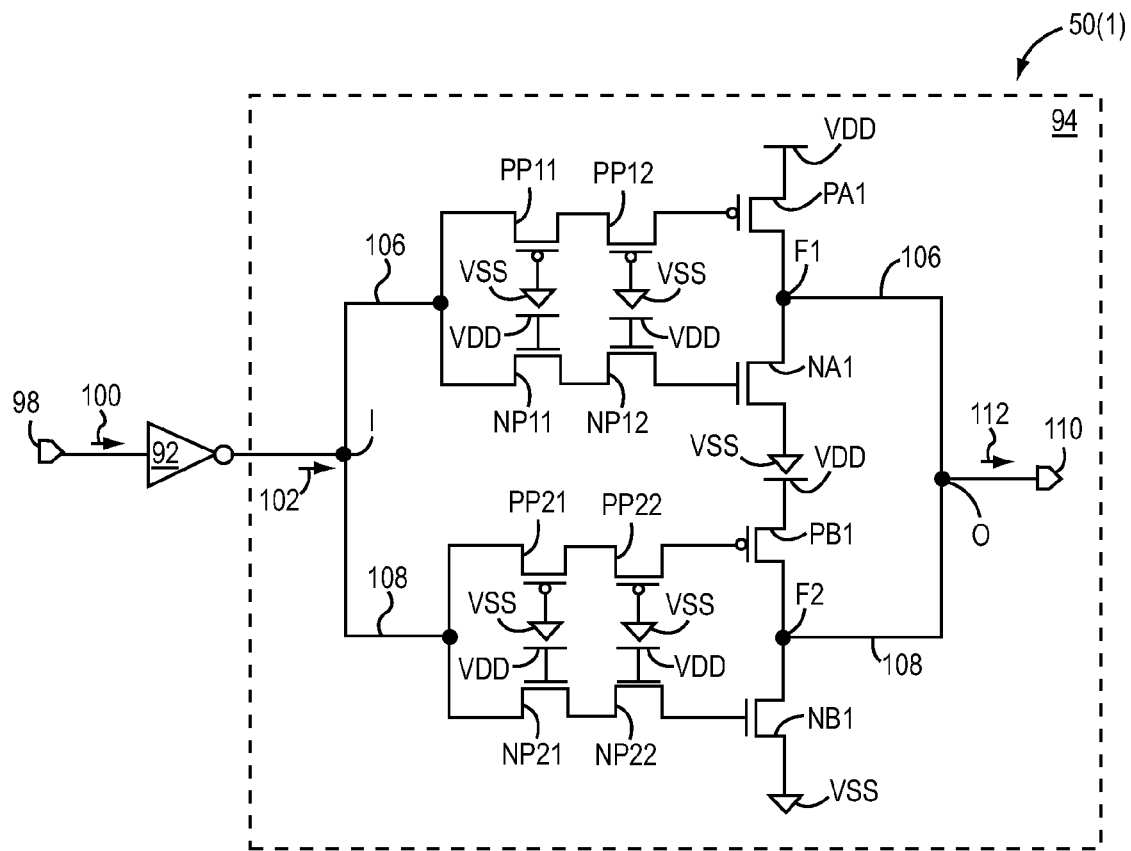
FIGS. 4A and 4B are circuit diagrams that illustrate exemplary delay elements which may be used as hardening elements in the flip-flop shown in FIG. 3.
Figure 4B:
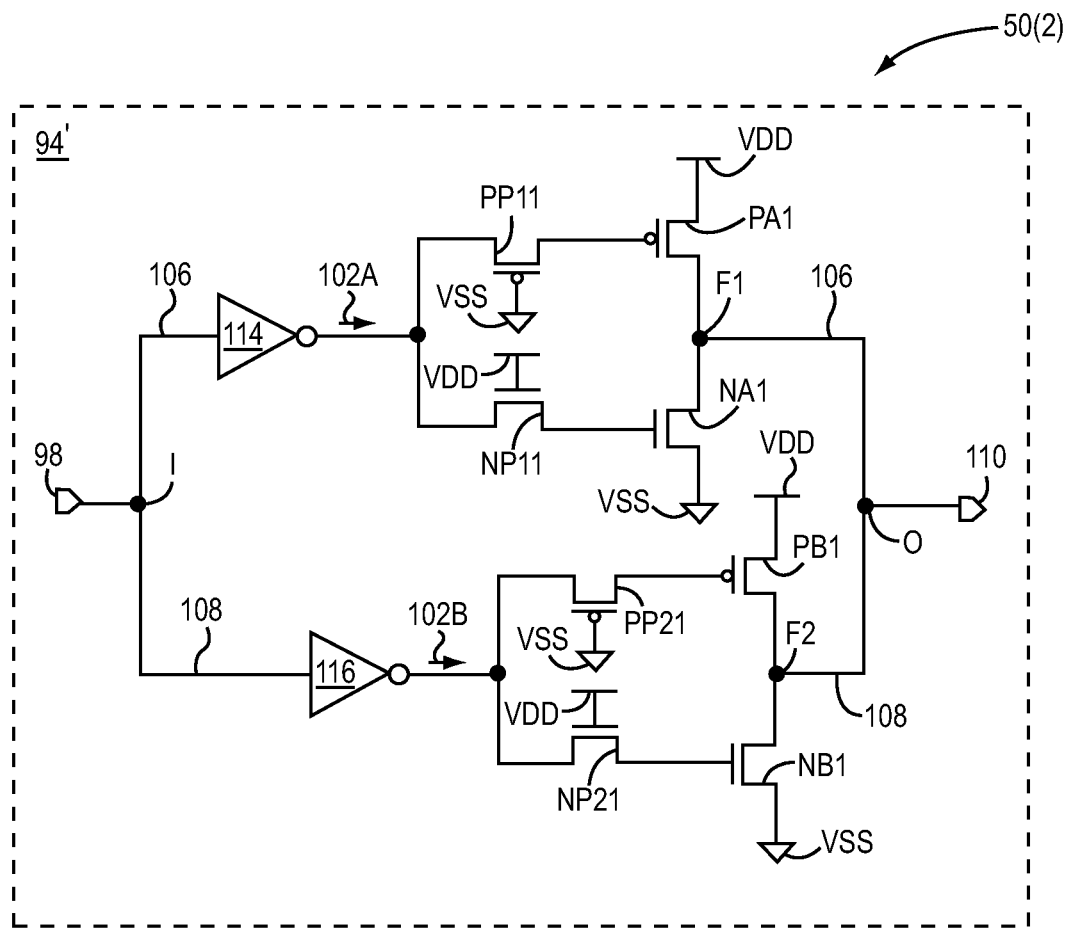

FIGS. 4A and 4B are circuit diagrams that illustrate one embodiment of a delay element 50(1) and a delay element 50(2). One or more of the delay elements 50A, 50B, 50C, 50D shown in FIG. 3 may be provided as the delay element 50(1) shown in FIG. 4A and/or the delay element 50(2) in FIG. 4B. However, it should be noted that any suitable type of delay element may be used in the flip-flop 86 shown in FIG. 3 such as inverter chains or inverter chains with added capacitance and/or long channel transistors. One issue with previously published delay elements, e.g., those that rely on current starving to achieve high delay, is that the drive current of a current starved device does provide long delay but, it also produces a disproportionately long SET if the output diffusion collects charge due to ionizing radiation. Thus, the resulting SET may be longer than allowed by the surrounding circuitry, with this hardening element itself causing a circuit failure due to excessive delay when collecting charge due to an impinging ionizing radiation particle track. Consequently, the delay elements should provide long delay from an input to output transition, but sufficient drive current when removing SET charge so that SETs in the delay circuits do not become limiting for the overall design.

Regarding the delay element 50(1) in FIG. 4A, the delay element 50(1) includes an inverter 92 and a delay gate 94. The inverter 92 has an input terminal 98 for receiving a bit signal 100 having bit state. With respect to the delay elements 50A, 50B, 50C, 50D, the input terminal 98 corresponds with the nodes DIDA, DIDB, DIDC, and DIDD (shown in FIG. 3), respectively, and the bit signal 100 corresponds with the output bit signal 58A, the output bit signal 58B, the feedback input bit signal 70, and the input bit signal 56 (shown in FIG. 3), respectively. The inverter 92 generates a bit signal 102 having a bit state that is inverted with respect to the bit state of the bit signal 100. It should be noted that in alternative embodiments, the delay element 50(1) may not include the inverter 92, but may instead only include the delay gate 94 to provide an inverting delay element.

The delay gate has two identical redundant paths 106, 108 from an node I to a node O. In this embodiment, the node O is coupled to an output terminal 110. With respect to the delay elements 50A, 50B, 50C, 50D, the output terminal 110 would be the nodes SDHOLD, SDFDBK, MDHOLD, and MDFDBK (shown in FIG. 3). The delay gate 94 includes a field effect transistor (FET) PA1, a FET NA1, a FET PB1, a FET NB1, a FET PP11, a FET PP12, a FET NP11, a FET NP12, a FET PP21, a FET PP22, a FET NP21, and a FET NP22. Each of the FETs PA1, PB1, PP11, PP12, PP21, and PP22 is a P-channel FET, while the FETs NA1, NB1, NP11, NP12, NP21, and NP22 are N-channel FETs. A gate of each of the FETs PP11, PP12, PP21, PP22 is connected to receive a low supply rail voltage (VSS) and a gate of each of the FETs NP11, NP12, NP21, and NP22 is connected to receive a high supply rail voltage (VDD). Hence, the FETs PP11, PP12, PP21, PP22 and the FETs NP11, NP12, NP21, and NP22 are coupled as pass transistors and are always turned on, and in particular, each of the FETs PP11, PP12, PP21, PP22 and the FETs NP11, NP12, NP21, and NP22 may be configured as long channel pass transistors. The FETs PP11, PP12, NP11, NP12 thus produce an RC delay from the redundant path 106 to the gates of the FETs PA1, NA1. Similarly, the FETs PP21, PP22, NP21, and NP22 produce an RC delay from the redundant path 108 to the gates of the FETs PB1 and NB1, respectively.

The FET PA1 is coupled as a pull up transistor and the FET NA1 is coupled as a pull down transistor at node F1. A gate of the FET PA1 is coupled to the PFETs PP11, PP12. A gate of the FET NA1 is coupled to the NFETs NP11, NP12. The FET PB1 is coupled as a pull up transistor and the FET NB1 is coupled as a pull down transistor at node F2. A gate of the FET PB1 is coupled to the PFETs PP21, PP22. A gate of the FET NB1 is coupled to the NFETs NP21, NP22. The FETs PA1, NA1, PB1, NB1 thus drive the node O so as to generate a bit signal 112 having a bit state set in accordance with the bit state of the bit signal 102 at the node I. Due to a low drive current from the FETs PP11, PP12, and a low drive current from the FETs PP21, PP22, charge collection at the nodes F1, F2 results in a long delay before changes to the bit state of the bit signal 102 result in changes to the bit state of the bit signal 112. With respect to the delay elements 50A, 50B, 50C, 50D, the bit signal 112 corresponds with the output bit signal 68A, the output bit signal 76A, the output bit signal 68B, and the output bit signal 76B (shown in FIG. 3), respectively.

In this manner, a propagation delay of the delay element 50(1) is set so as to be longer than the maximum (likely) SET duration, i.e., sufficient to mitigate SETs due to ions up to some maximum mass. More specifically, the propagation delay is significantly extended by the low drive current of the FETs PP11, PP12, PP21, PP22 and the FETs NP11, NP12, NP21, and NP22 (i.e., the long channel pass transistors) in the redundant paths 106, 108. In this manner, there is a low voltage swing at the gates of the FET PA1, the FET NA1, the FET PB1, and the FET NB1. With respect to the FETs PP11, PP12 and the FETS PP21, PP22, a voltage swing is approximately the VDD minus a PMOS threshold voltage. With respect to the FETs NP11, NP12 and the FETs NP21, NP22, the voltage swing is approximately the VDD minus an NMOS threshold voltage. A low voltage swing between the nodes F1 and F2 dissipates less power (e.g. 40% less) than would be required by an inverter to produce the same propagation delay.

The delay gate 94 also provides hardening. Just as with a current starved inverter, the charge collection of the FETs PP11, PP12, PP21, PP22 and the FETs NP11, NP12, NP21, NP22 from the gates of the FETs PA1, NA1, PB1, NB1 is slowly removed after a SET (resulting in a long SET duration at those nodes). However, note that a P-type diffusion may collect only positive charge (holes) and an N-type diffusion may collect only negative charge (electrons). Consequently, the source/drain diffusions of the FETs PP11 and PP12 may only be driven high, cutting off the FET PA1. Analogously, the source/drain diffusions of the FETs PP11 and PP12 may only be driven low, cutting off the FET NA1. Thus, charge collection at these diffusions (collection nodes) does not erroneously drive the output of the redundant path 106, but rather tri-states it. In this case, the output terminal 110 is driven to the correct value by the bottom circuit, namely by the FETs PB1 or NB1. The same analysis applied to the bottom circuit shows that charge collection at the source/drain nodes of the FETs PP21, PP22, NP21, and NP22 does not disturb the output terminal 110 as it is then redundantly driven by the FET PA1 or the FET NA1 as the FET PB1 or the FET NB1 is driven to cutoff. Additionally, since there are the redundant paths 106, 108, the SET duration does not significantly affect the delay element 50(1). With respect to the redundant path 106, if a SET pulls the node F1 low, the PFET PB1 drives the bit state of the bit signal 112 at the node O resulting in a shorter SET duration. More specifically, the diffusions coupled to the gate of the FET PA1 may collect holes as a result of the SET, and thus the SET may turn off the FET PA1. However, in this case, the FET PB1 will drive the bit signal 112 with full gate overdrive and the FET NB1 will maintain the bit state of the bit signal 112. A contention state does not result between the FET PA1 and the FET NB1, as the gates of each device can only be driven by a SET to cause the transistor to cut off. Similarly, if a SET pulls the gate of the FET NA1 low (it cannot be driven high since it collects only electrons), thereby turning off the FET NA1, the FET PB1 holds the bit state of the bit signal 112 at the node O. More specifically, the nodes connected to the gate of the FET NA1 collect only electrons, and thus the SET may turn off the FET NA1. However, in this case, the FET NB1 will drive the bit signal 112 with full gate overdrive and the FET PB1 will maintain the bit state of the bit signal 112. With respect to the redundant path 108, if a SET pulls the node F2 low or high, the FET PA1 and the FET NA1 provide the same reciprocal holding functionalities with respect to the FET PB1 and the FET NB1. The delay element 50(1) thus provides a long propagation delay without adversely affecting the worst-case SET duration. In one embodiment, a width of each of the FETs PP11, PP12, PP21, PP22, NP11, NP12, NP21, and NP22 is around 650 nm and a length of each of the FETs PP11, PP12, PP21, PP22, NP11, NP12, NP21, and NP22 is around 200 nm.

Referring now to FIG. 4B, FIG. 4B illustrates another embodiment of a delay element 50(2) that can be provided as one or more of the delay elements 50A, 50B, 50C, and 50D shown in FIG. 3. The delay element 50(2) operates in the same manner described above with respect to the delay element 50(1) shown in FIG. 4A. The delay element 50(2) thus includes the two redundant paths 106, 108 and a delay gate 94'. Furthermore, the delay gate 94' has the FETs PA1, NA1, PB1, NB1, PP11, NP11, PP21, and NP21 described above with respect to the delay gate 94 in FIG. 4A. However, in this embodiment, the delay element 50(2) shown in FIG. 4B does not include the inverter 92 shown in FIG. 4A and the delay gate 94' shown in FIG. 4B does not include the FETs PP12, NP12, PP22, and NP22 shown in FIG. 4A. Instead, an inverter 114 is coupled in the redundant path 106 between the node I and the FETs PP11, NP11. The inverter 114 is configured to receive the bit signal 100 and to generate a bit signal 102A having a bit state that is inverted with respect to the bit state of the bit signal 100. Similarly, an inverter 116 is coupled in the redundant path 108 between the node I and the FETs PP21, NP21. The inverter 116 is also configured to receive the bit signal 100 and to generate a bit signal 102B having a bit state that is inverted with respect to the bit state of the bit signal 100. While the delay element 50(2) shown in FIG. 4B may consume slightly more power than the delay element 50(1) shown in FIG. 4A, the delay element 50(2) is smaller and may be preferable in certain applications, particularly for operation at low power supply voltage VDD.

Figure 5:
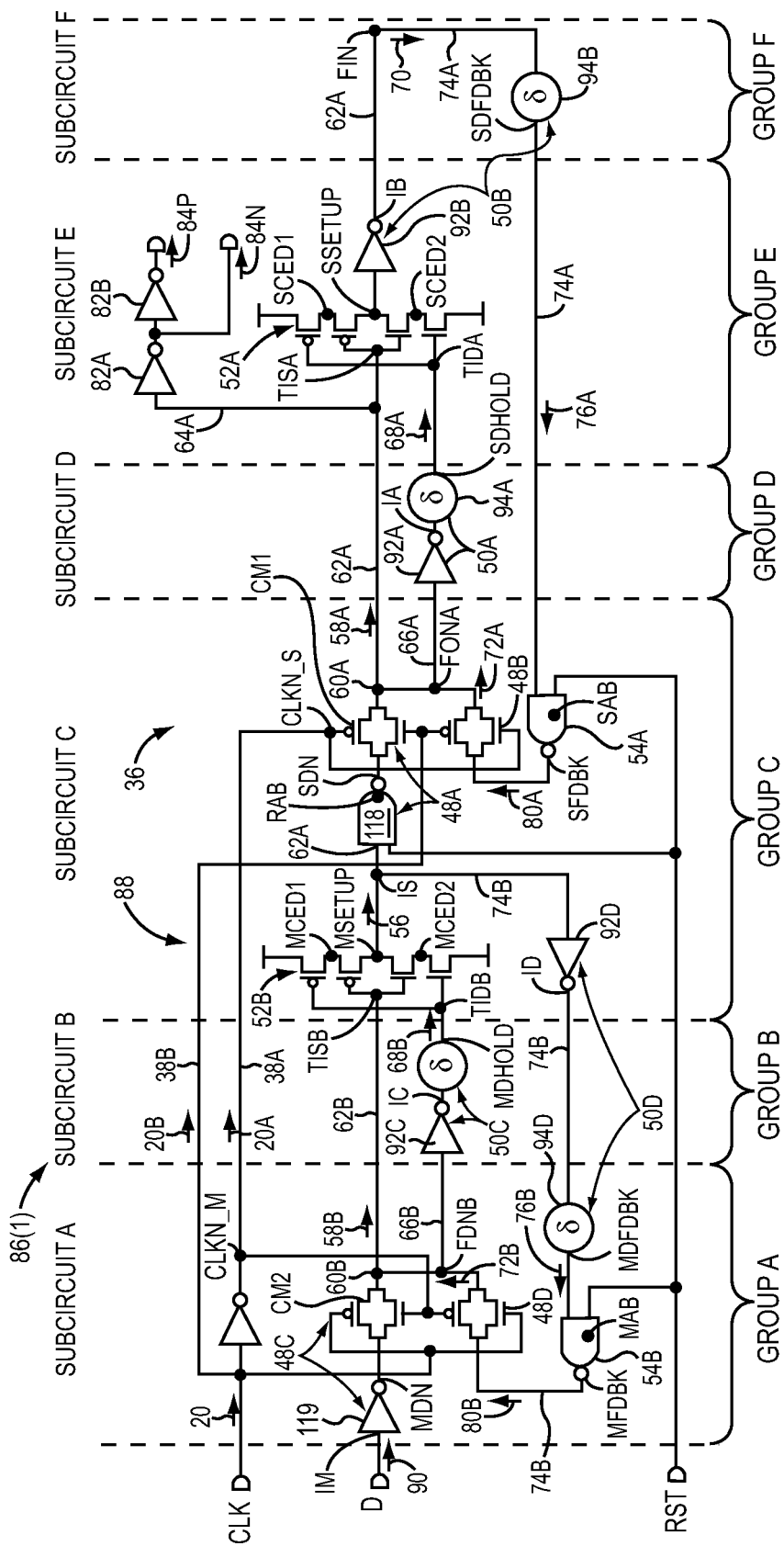
FIG. 5 illustrates a circuit diagram of one embodiment of the flip-flop shown in FIG. 3.

Referring now to FIG. 5, FIG. 5 illustrates a circuit diagram of a flip-flop 86(1). The flip-flop 86(1) is configured to provide a flip-flop function described above with respect to FIGS. 2-3. The flip-flop 86(1) shown in FIG. 5 also includes a circuit diagram of one embodiment of the latch 36 and the master latch 88 shown in FIG. 3.

The flip-flop 86(1) implements a particular embodiment of the flip-flop function described above with respect to FIG. 3 based on the specific components utilized by the flip-flop 86(1). With regard to the setup stage 44A of the latch 36, a NAND gate 118 and a CMOS transmission gate CM1 provide the sampling stage 48A, which is activated when the clock signal 20 is high. As shown in FIG. 3, the NAND gate 118 also receives the reset signal 78. Thus, the input bit state of input bit signal 56 is sampled by the sampling stage 48A when the clock signal 20 is high and the reset signal 78 is in a non-reset state. Furthermore, the output bit state of the output bit signal 58A is inverted with respect to the input bit state of the input bit signal 56 when the input bit signal 56 is sampled by the sampling stage 48A. A node SDN is provided in a main branch of the setup path 62A between the NAND gate 118 and the CMOS transmission gate CM1. The NAND gate 118 has an internal node RAB.

The tristate gate 52A is provided as an inverting Muller-C element. As such, when the output bit state of the output bit signal 58A and the output bit state of the output bit signal 68A are equal, the feedback input bit state of the feedback input bit signal 70 is inverted (i.e., opposite) with respect to the output bit state of the output bit signal 58A and the output bit state of the output bit signal 68A. The delay element 50A is provided as the delay element 50(1) shown in FIG. 4A. Thus, the delay element 50A includes an inverter 92A (which is the same as the inverter 92 shown in FIG. 4A), a delay gate 94A (which is the same as the delay gate 94 shown in FIG. 4A), and a node IA (which is the same as the node I shown in FIG. 4A) between the inverter 92A and the delay gate 94A. The tristate gate 52A further includes internal nodes SCED1 and SCED2.

With regard to the feedback stage 46A of the latch 36, the delay element 50B is also provided as one embodiment of the delay element 50(1) shown in FIG. 4A. Thus, the delay element 50B includes an inverter 92B (which is the same as the inverter 92 shown in FIG. 4A), a delay gate 94B (which is the same as the delay gate 94 shown in FIG. 4A), and a node IB (which is the same as the node I shown in FIG. 4A) between the inverter 92B and the delay gate 94B.

The reset gate 54A is provided as a NAND gate. Thus, the feedback output bit state of the feedback output bit signal 72A is inverted with respect to the feedback sampling bit state of the feedback sampling signal 80A when the reset signal is in the non-reset state. The sampling stage 48B in the feedback stage 46A is provided as a CMOS transmission gate that is activated when the clock signal 20 is low. The reset gate 54A further includes an internal node SAB. Note also that the negative side clock signal 20A is provided to both the sampling stage 48A and the sampling stage 48B from node CLKN_S.

With regard to the setup stage 44B of the master latch 88, an inverter 119 and a CMOS transmission gate CM2 provide the sampling stage 48C, which is activated when the clock signal 20 is low. As such, the output bit state of the output bit signal 58B is inverted with respect to the input bit state of the initial input bit signal 90 when the initial input bit signal 90 is sampled. A node MDN is provided in the setup path 62A between the inverter 119 and the CMOS transmission gate CM2. The delay element 50C is provided as one embodiment of the delay element 50(1) shown in FIG. 4A. The tristate gate 52B is provided as an inversion Muller-C element. As such, when the output bit state of the output bit signal 58B and the output bit state of the output bit signal 68B are equal, the input bit state of the input bit signal 56 is inverted (i.e., opposite) with respect to the output bit state of the output bit signal 58B and the output bit state of the output bit signal 68B. In this embodiment, the delay element 50C includes an inverter 92C (which is the same as the inverter 92 shown in FIG. 4A), a delay gate 94C (which is the same as the delay gate 94 shown in FIG. 4A), and a node IC (which is the same as the node I shown in FIG. 4A) between the inverter 92C and the delay gate 94C. The tristate gate 52B further includes internal nodes MCED1 and MCED2.

With regard to the feedback stage 46B of the master latch 88, the delay element 50D is also provided as one embodiment of the delay element 50(1) shown in FIG. 4A. As in the latch 36, the reset gate 54B of the master latch 88 is provided as a NAND gate. Thus, the feedback output bit state of the feedback output bit signal 72B is inverted with respect to the feedback sampling bit state of the feedback sampling signal 80B when the reset signal 78 is in the non-reset state. The sampling stage 48D in the feedback stage 46B is provided as a CMOS transmission gate that is activated when the clock signal 20 is high. The reset gate 54B has an internal node MAB. In this embodiment, the delay element 50D includes an inverter 92D (which is the same as the inverter 92 shown in FIG. 4A) and a delay gate 94D (which is the same as the delay gate 94 shown in FIG. 4A) and a node ID. Note also that the negative side clock signal 20A is provided to both the sampling stage 48C and the sampling stage 48D from node CLKN_M.

With regard to the embodiment of the flip-flop 86(1) shown in FIG. 5, each of the nodes MDN, CLKN_M, 60A, ID, MDFDBK, MAB, MFDBK, MDHOLD, IC, MCED1, MCED2, MSETUP, ID, SDN, 60B, SAB, SFDBK, IA, SDHOLD, SCED1, SCED2, SSETUP, and IB is a charge collection node. A charge collection node is a node capable of collecting charge carriers created by an ionizing particle track, which may then be transported to these nodes through the substrate and/or well by diffusion or drift, and subsequently injected or collected, and thus nodes whose electrical potential can be modified as a result of such charge carrier gradients. Some exemplary types of charge collection nodes are P doped regions and N doped regions within transistors, since P doped regions and N doped regions diffuse injected or collected charges within a semiconductor substrate. Note that as mentioned, P-type diffusions may collect positive charge (holes) and N-type diffusions may collect negative charge (electrons). Furthermore, the electrical potential of the P doped regions and the N doped regions are modified as a result of charge carrier gradients within the semiconductor substrate. At CMOS nodes, e.g., where connected to both N-type and P-type diffusions, where the NMOS and PMOS devices are connected together, the nodes may collect charge to drive that node to either direction, depending on the node state and whether the N- or P-type diffusion collects charge. Finally, such nodes may collect charge, but may not depending on the impinging charge gradients and the logic state of the nodes. However, it should be noted that the nodes MDN, CLKN_M, 60A, ID, MDFDBK, MAB, MFDBK, MDHOLD, IC, MCED1, MCED2, MSETUP, ID, SDN, 60B, SAB, SFDBK, IA, SDHOLD, SCED1, SCED2, SSETUP, and IB can also be other types of charge collection nodes and are not restricted to P doped regions and N doped regions. For example, the interleaving techniques described herein are applicable to Silicon on Insulator (SOI) and other types of semiconductor fabrication technologies.

The flip-flop 86(1) shown in FIG. 5 includes subcircuit A, subcircuit B, subcircuit C, subcircuit D, subcircuit E, and subcircuit F. The subcircuits A-F are formed on a semiconductor substrate and are configured to operate in a sequential logical order to provide the flip-flop function described above. More specifically, each subcircuit A-F is configured to provide a corresponding subfunction so that the subcircuits A-F together are operable to provide multiple subfunctions. The subfunctions are provided by the subcircuits in a sequential logical order so as to provide the flip-flop function of the flip-flop 86(1). It should be noted that the subcircuits A-F are shown in FIG. 5 in the sequential logical order. The sequential logical order is an order in which valid bit states are sequentially generated in the setup stages 44A, 44B and in the feedback stages 46A, 46B. Note that the sequential logical order goes in a first logic direction with respect to the setup stages 44A, 44B, but in a second logic direction with respect to the feedback stages 46A, 46B. As such, the sequential logical order can be determined from the subfunctions of each of the subcircuits A-F by following the order in which valid bit states are received and generated in the flip-flop 86(1) during a clock cycle.

While FIG. 5 illustrates the subcircuits in the sequential logical order, the subcircuits A-F are interleaved out of the sequential logical order with respect to the subfunction provided by each subcircuit A-F, as described in further detail below (see FIG. 6). Therefore, while FIG. 5 illustrates the flip-flop 86(1) in the sequential logical order, the physical order of the subcircuits A-F in the flip-flop 86(1) is different from the sequential logical order of the subcircuits A-F (see FIG. 9, discussed below). More specifically, the physical order of the subcircuits A-F is a hardened physical order, as described in further detail below. Each of the subcircuits A-F includes a different portion of the latch 36 and/or the master latch 88.

Given that each of the subcircuits A-F includes different portions of the latch 36 and/or the master latch 88, the components in each of the subcircuits A-F determine the corresponding subfunction or corresponding subset of the subfunctions provided by each of the subcircuits A-F. Thus, the corresponding subfunction or corresponding set of the subfunctions of each of the subcircuits A-F is described above. In this embodiment, the sequential circuit A includes the sampling stage 48C of the setup stage 44B, the sampling stage 48D of the feedback stage 46B, the reset gate 54B of the feedback stage 46B, and the delay gate 94 of the delay element 50D. As such, the subcircuit A includes the node CLKN_M, the node MFDBK, the node MAB, the node MDFDBK, and the storage node 60B. The node CLKN_M, the node MFDBK, the node MAB, the node MDFDBK, and the storage node 60B are a congenial group of charge collection nodes Group A. The subcircuit B includes the inverter 92C of the delay element 50C of the master latch 88. As such, the subcircuit B includes the node MDHOLD and the node IC, which are a congenial group of charge collection nodes Group B. The subcircuit C includes the tristate gate 52B, the inverter 92B of the delay element 50D, the sampling stage 48A, the sampling stage 48B, and the NAND 118. Thus, the subcircuit C includes portions of both the master latch 88 and the latch 36. The subcircuit C also includes the node MCED1, the node MCED2, the node MSETUP, the node SDN, the node SFDBK, the node SAB, the node ID, the node CLKN_S, the internal node RAB, and the storage node 60A. The node MCED1, the node MCED2, the node MSETUP, the node SDN, the node SFDBK, the internal node SAB, the node ID, the node CLKN_S, the internal node RAB, and the storage node 60A are a congenial group of charge collection nodes Group C. The subcircuit D includes the delay element 50A. As such, the subcircuit D includes the node IA and the node SDHOLD, which are a congenial group of charge collection nodes Group D. The subcircuit E includes the inverter 82A, the inverter 82B, the tristate gate 52A, and the inverter 92B of the delay element 50B. As such, the subcircuit E includes the node SCED1, the node SCED2, the node SSETUP, and the node IB, which are a congenial group of charge collection nodes Group E. The subcircuit F includes the delay gate 94B of the delay element 50B in the feedback stage 46A of the latch 36. As such, the subcircuit F includes the node SDFDBK, which is a congenial group of a charge collection node Group F. A congenial group of charge collection nodes A-F is "congenial" because every charge collection node in the group can be simultaneously upset without causing a uncorrectable error in the flip-flop 86(1). For example, the node CLKN_M, the node MFDBK, the node MAB, the node MDFDBK, and the storage node 60B in the congenial group of charge collection nodes Group A can be simultaneously upset, but any error is corrected by the flip-flop 86(1). In this case, upsets in the congenial group of charge collection nodes Group A are corrected by the feedback output bit signal 72B from the feedback stage 46B or the initial input bit signal 90. The same is true for the other congenial groups of charge collection nodes Groups B-F. Another way of looking at a congenial group is that the nodes are connected combinationally, with no intervening hardening or delay elements. Thus, a transition at one node may trigger subsequent transitions through the combinationally coupled nodes with minimal intervening delay, and can be thought of as one super-node, with similar response to upset.

Referring again to FIG. 5, the subcircuits C-F, which include portions of the latch 36 (i.e., the slave latch), are interleaved with the subcircuits A-C, which include portions of the master latch 88. The subcircuits A-F are interleaved so that the charge collection nodes driving the inputs and the charge collection nodes being driven by the outputs of the hardening elements are separated in different (and nonadjacent, as described below) subcircuits A-F. In this embodiment, the delay elements 50A, 50B, 50C, and 50D and the tristate gates 52A, 52B are the hardening elements. More specifically, the subcircuits A-F are arranged so that the charge collection nodes driving inputs to each of the delay elements 50A, 50B, 50C, 50D (i.e., (referring also to FIG. 3) the node SHOLD for the delay element 50A, the node SSETUP for the delay element 50B, the node MHOLD for the delay element 50C, the node MSETUP for the delay element 50D) are in a different one of the subcircuits A-F than a particular one of the subcircuits A-F with the charge collection nodes being driven by outputs of each of the delay elements 50A, 50B, 50C, 50D (i.e., the node SDHOLD for the delay element 50A, the node SDFDBK for the delay element 50B, the node MDHOLD for the delay element 50C, the node MDFDBK for the delay element 50D). With regard to the charge collection nodes driving inputs to each of the delay elements 50A, 50B, 50C, 50D (i.e., the storage node 60A for the delay element 50A, the node SSETUP for the delay element 50B, the storage node 60B for the delay element 50C, the node MSETUP for the delay element 50D), the storage node 60A for the delay element 50A is in the subcircuit C, and thus in the congenial group of charge collection nodes Group C; the node SSETUP for the delay element 50B is in the subcircuit E, and thus in the congenial group of charge collection nodes Group E; the storage node 60B for the delay element 50C is in the subcircuit A, and thus in the congenial group of charge collection nodes Group A; and the node MSETUP for the delay element 50D is in the subcircuit C, and thus in the congenial group of charge collection nodes Group C. With regard to the charge collection nodes being driven by outputs of each of the delay elements 50A, 50B, 50C, 50D (i.e., the node SDHOLD for the delay element 50A, the node SDFDBK for the delay element 50B, the node MDHOLD for the delay element 50C, the node MDFDBK for the delay element 50D), the node SDHOLD for the delay element 50A is in the subcircuit D, and thus in the congenial group of charge collection nodes Group D; the node SDFDBK for the delay element 50B is in the subcircuit F, and thus in the congenial group of charge collection nodes Group F; the node MDHOLD for the delay element 50C is in the subcircuit B, and thus in the congenial group of charge collection nodes Group B; and the node MDFDBK for the delay element 50D is in the subcircuit A, and thus in the group of congenial charge collection nodes Group A. In this manner, the charge collection nodes driving inputs to each of the delay elements 50A, 50B, 50C, 50D (i.e., the node SHOLD for the delay element 50A, the node SSETUP for the delay element 50B, the node MHOLD for the delay element 50C, the node SSETUP for the delay element 50D) and the charge collection nodes being driven by outputs of each of the delay elements 50A, 50B, 50C, 50D (i.e., the node SDHOLD for the delay element 50A, the node SDFDBK for the delay element 50B, the node MDHOLD for the delay element 50C, the node MDFDBK for the delay element 50D) are separated in different subcircuits A-F and through interleaving (described in further detail below) can be separated so that a single SET generated by an ionizing radiation particle track cannot simultaneously upset the charge collection nodes driving inputs to each of the delay elements 50A, 50B, 50C, 50D (i.e., the node SHOLD for the delay element 50A, the node SSETUP for the delay element 50B, the node MHOLD for the delay element 50C, the node SSETUP for the delay element 50D) and the charge collection nodes being driven by outputs of each of the delay elements 50A, 50B, 50C, 50D (i.e. the node SDHOLD for the delay element 50A, the node SDFDBK for the delay element 50B, the node MDHOLD for the delay element 50C, the node MDFDBK for the delay element 50D) except when the ionizing radiation particle strikes nearly parallel to a semiconductor surface. The likelihood thus drops rapidly with increasing node separation.

With regard to the charge collection nodes driving inputs to the tristate gate 52A (i.e., the storage node 60A, the node SDHOLD), the storage node 60A is in the subcircuit C and the node SDHOLD is in the subcircuit D. The node SSETUP being driven by the output of the tristate gate 52A is in the subcircuit E. With regard to the charge collection nodes driving inputs to the tristate gate 52B (i.e., the storage node 60B, the node MDHOLD) the storage node 60B is in the subcircuit A and the node MDHOLD is in the subcircuit B. The node MSETUP being driven by the output of the tristate gate 52B is in the subcircuit C.

Figure 6:
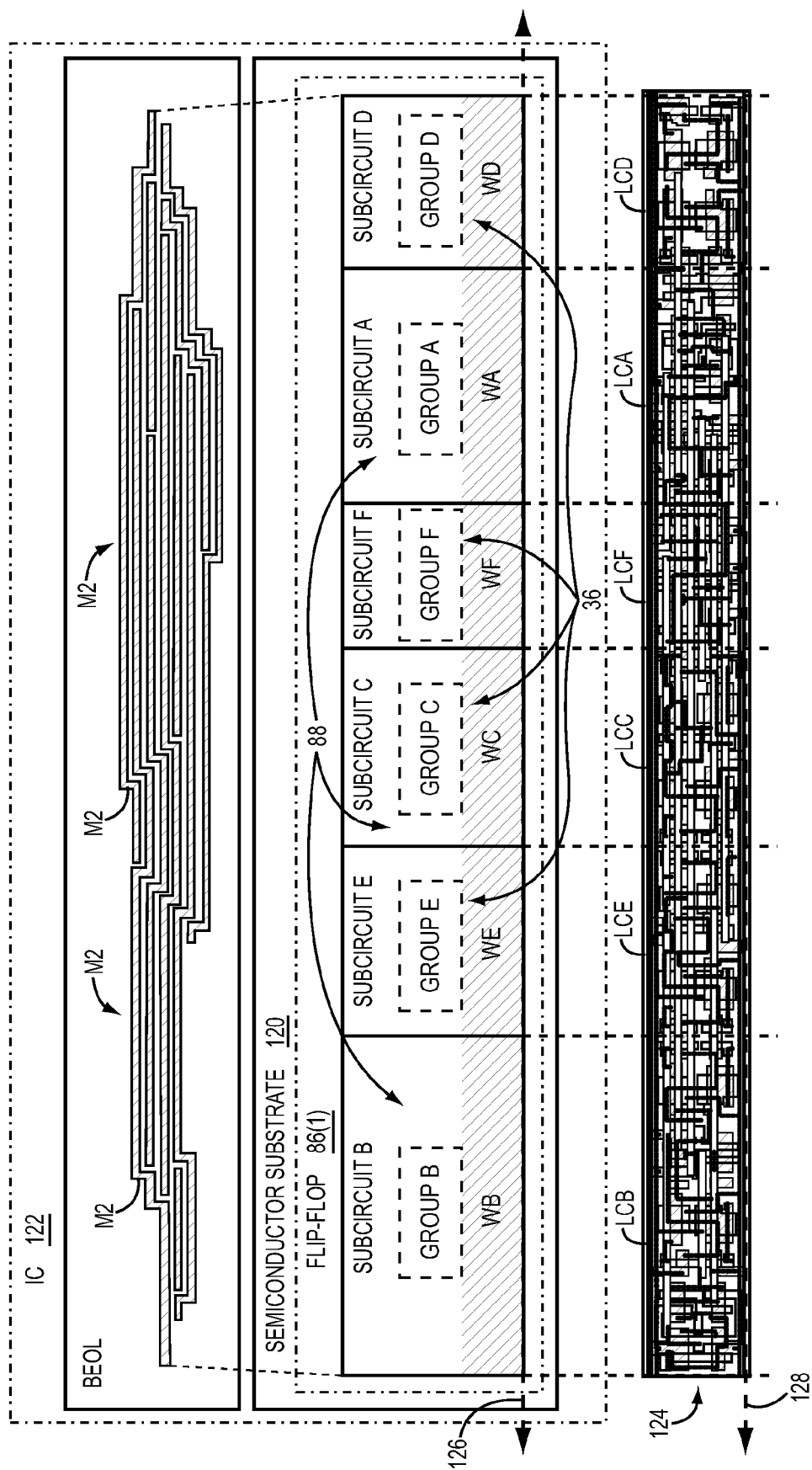
FIG. 6 is an exemplary block diagram of the flip-flop shown in FIG. 5 formed on a semiconductor substrate within an integrated circuit (IC) package, along with an exemplary physical layout used to form the flip-flop on the semiconductor substrate.

FIG. 6 illustrates a block diagram of one embodiment the flip-flop 86(1) shown in FIG. 5 formed on a semiconductor substrate 120 within an integrated circuit (IC) 122 and a physical layout 124 used to form the flip-flop 86(1) on the semiconductor substrate 120. For example, the physical layout 124 may be generated through Very Large Scale Integration (VLSI) computer-aided design (CAD) approaches, including simulation, and thus may be a data structure utilized with an automated IC fabrication software tool to form the flip-flop 86(1) shown in FIG. 6. The semiconductor substrate 120 defines a vector 126 and the subcircuits A-F of the flip-flop 86(1) are interleaved along the vector out of the sequential logical order (cf. the flip-flop 86(1) in the sequential logical order as shown in FIG. 5) with respect to the subfunction provided by each of the subcircuits A-F. In other words, FIG. 6 illustrates the subcircuits A-F in accordance with a physical order of the subcircuits A-F, and the physical order of the subcircuits A-F is different from the sequential logical order (cf. the flip-flop 86(1) in the sequential logical order as shown in FIG. 5) or the order obtained by optimizing the gate/diffusion order, such as that generated by mapping their order as an optimal Euler path (commonly used to produce the most dense circuit layouts). Accordingly, the subcircuits A-C with portions of the master latch 88 shown in FIG. 6 are interleaved with the subcircuits C-F having portions of the latch 36.

The subcircuits A-F may be interleaved along the vector 126 by abutting and/or intersecting the vector 126. In this embodiment, each of the subcircuits A-F abuts the vector 126 and the subcircuits A-F form a row along the vector 126. As described above, the subcircuit A includes the congenial group of charge collection nodes Group A, the subcircuit B includes the congenial group of charge collection nodes Group B, the subcircuit C includes the congenial group of charge collection nodes Group C, the subcircuit D includes the congenial group of charge collection nodes Group D, the subcircuit E includes the congenial group of charge collection nodes Group E, the subcircuit F includes the congenial group of the charge collection node Group F.

The physical order of the subcircuits A-F is a hardened physical order (i.e., [BECFAD]). More specifically, the physical order of the subcircuits A-F is provided such that combinations of the charge collection nodes from the congenial groups of the charge collection nodes Groups A-F which would result in uncorrectable errors if simultaneously upset are separated by interleaving and are not adjacent to one another. For example, since simultaneously upsetting one or more of the charge collection nodes in the congenial group of charge collection nodes Group A and one or more of the charge collection nodes in the congenial group of charge collection nodes Group B would result in an uncorrectable error, the subcircuit A and the subcircuit B are separated by interleaving and are not adjacent. In this embodiment, the subcircuit A that includes a portion of the master latch 88 is interleaved along the vector 126 between the subcircuit F and the subcircuit D, which both include one of the portions of the slave latch 36.

Since simultaneously upsetting one or more of the charge collection nodes in the congenial group of charge collection nodes Group B and one or more of the charge collection nodes in the congenial group of charge collection nodes Group C would result in an uncorrectable error, the subcircuit B and the subcircuit C are separated by interleaving and are not adjacent. In addition, since simultaneously upsetting one or more of the charge collection nodes in the congenial group of charge collection nodes Group C and one or more of the charge collection nodes in the congenial group of charge collection nodes Group D would result in an uncorrectable error, the subcircuit C and the subcircuit D are separated by interleaving and are not adjacent. Also, since simultaneously upsetting one or more of the charge collection nodes in the congenial group of charge collection nodes Group D and one or more of the charge collection nodes in the congenial group of charge collection nodes Group E would result in an uncorrectable error, the subcircuit D and the subcircuit E are separated by interleaving and are not adjacent.

In this embodiment, the subcircuit E that includes a portion of the latch 36 is interleaved along the vector 126 between the subcircuit B and the subcircuit C, both of which include one of the portions of the master latch 88. Since simultaneously upsetting one or more of the charge collection nodes in the congenial group of charge collection nodes Group E and one or more of the charge collection nodes in the congenial group of charge collection nodes Group F would result in an uncorrectable error, the subcircuit E and the subcircuit F are separated by interleaving and are not adjacent. In this manner, the physical order of the flip-flop 86(1) in the semiconductor substrate 120 provides hardening.

As shown in FIG. 6, the subcircuits A-F include wells (referred to generically as element W and specifically as elements WA-WF). The subcircuit A thus includes the well WA. The subcircuit B includes the well WB. The subcircuit C includes the well WC. The subcircuit D includes the well WD. The subcircuit E thus includes the well WE. Finally, the subcircuit F includes the well WF. The wells W in this example are all N-wells. In this embodiment, the vector 126 and the row extend with the wells W. In this embodiment, the wells W are contiguous and the row is defined as being in a direction of the wells W such that the vector 126 is parallel to the direction of the wells W. The wells W are formed by the semiconductor substrate 120 within the IC 122.

Also shown in FIG. 6 is a back end of line (BEOL) of the IC 122 that is formed on the semiconductor substrate 120. The BEOL includes metal traces that interconnect the subcircuits A-F. In this embodiment, the metal traces may be formed using only metallic layers M1 and M2 (not shown) within the BEOL. In this manner, routing blockage is minimized.

The physical layout 124 shown in FIG. 6 describes a physical topology of the flip-flop 86(1). The physical layout 124 may be used to form the flip-flop 86(1) using automated IC fabrication technology, such as VLSI CAD tools. The physical layout 124 includes multiple layout cells (referred to generically as elements LC and specifically as elements LCA-LCF) physically representing the subcircuits A-F. More specifically, the layout cell LCA physically represents the subcircuit A. The layout cell LCB physically represents the subcircuit B. The layout cell LCC physically represents the subcircuit C. The layout cell LCD physically represents the subcircuit D. A layout cell LCE physically represents the subcircuit E. Finally, the layout cell LCF physically represents the subcircuit F.

The physical layout 124 defines a vector 128, and the layout cells LC are interleaved along the vector 128. The vector 128 corresponds to the vector 126 of the semiconductor substrate 120. As explained in further detail below, combinations of the charge collection nodes that result in uncorrectable errors are in different layout cells. Additionally, the layout cells LC are interleaved along the vector 128 such that the layout cells LC with combinations of the charge collection nodes that result in uncorrectable errors are not adjacent. In this embodiment, the layout cell LCA includes the congenial group of the change dissipation nodes Group A. The layout cell LCB includes the congenial group of the change dissipation nodes Group B. The layout cell LCC includes the congenial group of the change dissipation nodes Group C. The layout cell LCD includes the congenial group of the change dissipation nodes Group D. The layout cell LCE includes the congenial group of the change dissipation nodes Group E. The layout cell LCF includes the congenial group of the change dissipation node Group F.

Subsets of the layout cells LCA-LCF with combinations of the charge collection nodes (in the congenial groups of charge collection nodes Groups A-F) that result in uncorrectable errors are not adjacent to one another. For example, the layout cells LCA-LCB, the layout cells LCA and LCC, the layout cells LCB-LCC, the layout cells LCC-LCD, the layout cells LCC and LCE, the layout cells LCD-LCE, and the layout cells LCE-LCF include combinations of the charge collection nodes that if simultaneously upset would result in uncorrectable errors. As such, the layout cells LCA-LCB, the layout cells LCA and LCC, the layout cells LCB-LCC, the layout cells LCC-LCD, the layout cells LCC and LCE, the layout cells LCD-LCE, and the layout cells LCE-LCF are not adjacent. A layout order of the layout cells LC is thus a hardened layout order. In this embodiment, the layout cells LCA-LCF abut the vector 128 and are placed in a row that is defined by the vector 128.

Figure 7:
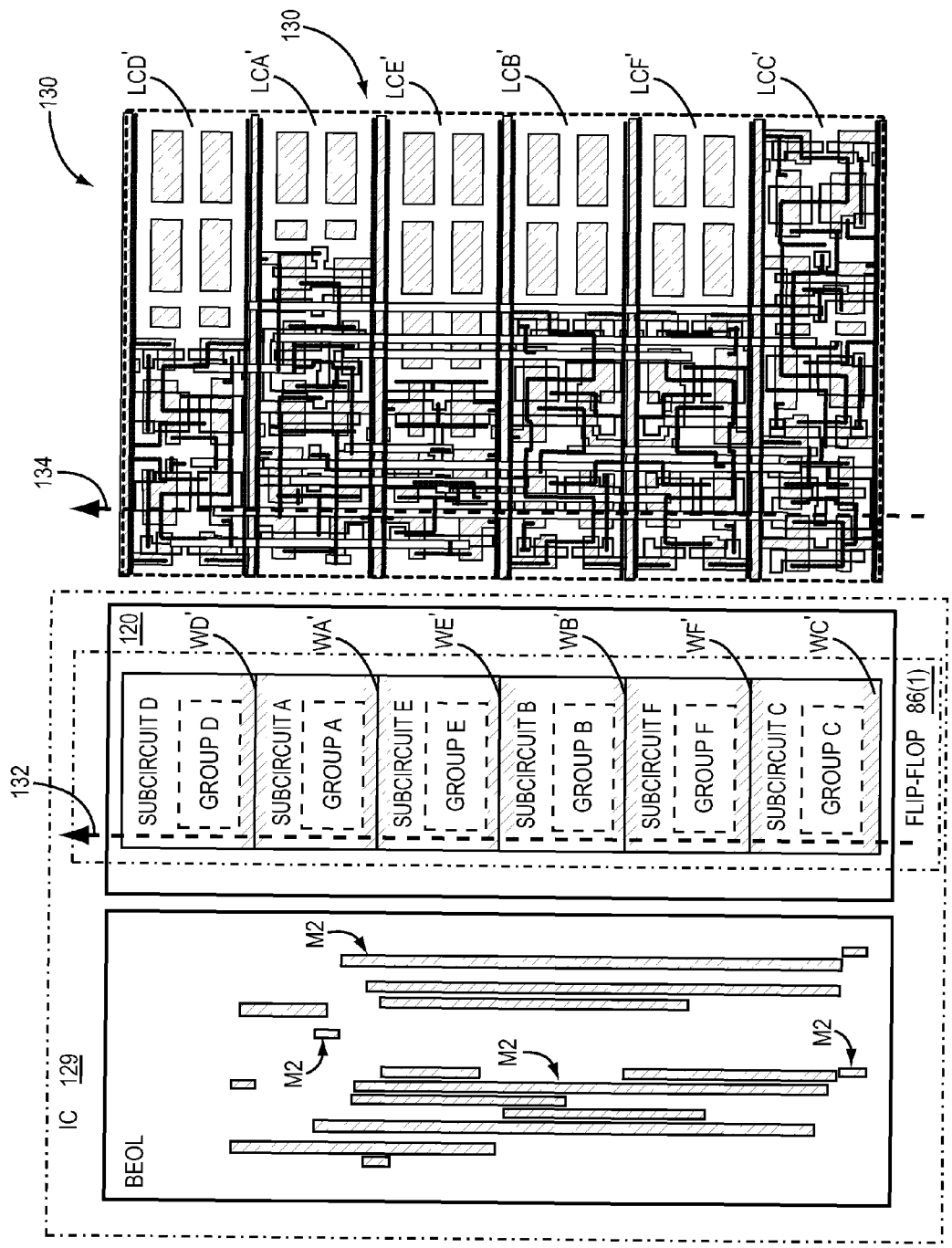
FIG. 7 is another exemplary block diagram of the flip-flop shown in FIG. 5 formed on the semiconductor substrate within another exemplary IC package, along with another exemplary physical layout used to form the flip-flop on the semiconductor substrate.

FIG. 7 illustrates a block diagram of one embodiment the flip-flop 86(1) shown in FIG. 5 formed on the semiconductor substrate 120 within an IC 129 and a physical layout 130 used to form the flip-flop 86(1) on the semiconductor substrate 120. For example, the physical layout 130 may be generated through VLSI automation and thus may be a data structure utilized with an automated IC fabrication system to form the flip-flop 86(1) shown in FIG. 7. As shown in FIG. 7, the semiconductor substrate 120 defines a vector 132 and the subcircuits A-F of the flip-flop 86(1) are interleaved along the vector 132 out of the sequential logical order (cf. the flip-flop 86(1) in the sequential logical order as shown in FIG. 5) with respect to the subfunction provided by each of the subcircuits A-F. In other words, FIG. 7 illustrates the subcircuits A-F in accordance to a physical order of the subcircuits A-F and the physical order of the subcircuits A-F is different from the sequential logical order (cf. the flip-flop 86(1) in the sequential logical order as shown in FIG. 5). Accordingly, the subcircuits A-C with portions of the master latch 88 shown in FIG. 7 are interleaved with the subcircuits C-F having portions of the latch 36 shown in FIG. 7. In this example, the physical order (i.e., [DAEBFC]) of the flip-flop 86(1) shown in FIG. 7 is different than the physical order (i.e., [BECFAD]) of the flip-flop 86(1) as shown in FIG. 6.

The subcircuits A-F may be interleaved along the vector 132 by either abutting and/or intersecting the vector 132. In this embodiment, each of the subcircuits A-F intersects the vector 132 and the vector 132 is provided so that the subcircuits A-F are formed in a column. The physical order of the subcircuits A-F is provided such that combinations of the charge collection nodes that would result in uncorrectable errors if simultaneously upset are separated by interleaving and are not adjacent to one another.

As shown in FIG. 7, the subcircuits A-F include wells (referred to generically as element W' and specifically as elements WA'-WF'). The subcircuit A thus includes the well WA'. The subcircuit B includes the well WB'. The subcircuit C includes the well WC'. The subcircuit D includes the well WD'. The subcircuit E thus includes the well WE'. Finally, the subcircuit F includes the well WF'. The wells W' in this example are all N-wells. In this embodiment, the vector 132 and the column extend down and thus substantially perpendicular to the wells W'. In this embodiment, the wells W' are non-contiguous and the column is defined as being in a direction of the wells W' such that the vector 132 is perpendicular to the direction of the wells W'. The wells W' are formed by the semiconductor substrate 120 within the IC 129. By providing the subcircuits A-F in the column and across the wells W', the wells W' provide the flip-flop 86(1) shown in FIG. 7 with additional hardening. In particular, the wells W' can absorb greater amount of charge from SETs due to separation of the wells W' in the subcircuits A-F so less charge is collected by the collection nodes.

Also shown in FIG. 7 is a back end of line (BEOL) of the IC 129 that is formed on the semiconductor substrate 120. The BEOL includes metal traces that interconnect the subcircuits A-F. In this embodiment, the metal traces may be formed using only the metallic layer M2 within the BEOL. In this manner, routing blockage is minimized. Those skilled in the art will recognize that different process technologies and libraries, or combinations thereof, may have different metal directions for the metallic layer M2 and a metallic layer M3 (not shown), and different capability for routing on other layers, e.g., polysilicon or a metallic layer M0 (not shown). Thus, the diagram is representative, and the metallic layers M2 and M3 may be required in either the horizontal or vertical layout in some technologies.

The physical layout 130 shown in FIG. 7 describes a physical topology of the flip-flop 86(1). The physical layout 130 may be used to form the flip-flop 86(1) using an automated IC fabrication technology. The physical layout 130 shown in FIG. 7 includes multiple layout cells (referred to generically as elements LC' and specifically as elements LCA'-LCF') physically representing the subcircuits A-F. More specifically, a layout cell LCA' physically represents the subcircuit A. A layout cell LCB' physically represents the subcircuit B. A layout cell LCC' physically represents the subcircuit C. A layout cell LCD' physically represents the subcircuit D. A layout cell LCE' physically represents the subcircuit E. Finally, a layout cell LCF' physically represents the subcircuit F.

The physical layout defines a vector 134, and the layout cells LC' are interleaved along the vector 134. As explained in further detail below, combinations of the charge collection nodes that result in uncorrectable errors are in different layout cells LCA'-LCF'. Additionally, the layout cells LCA'-LCF' are interleaved along the vector 134 such that subsets of the layout cells LC' with combinations of the charge collection nodes that result in uncorrectable errors are not adjacent. In this embodiment, the layout cell LCA' includes the congenial group of the change dissipation nodes Group A. The layout cell LCB' includes the congenial group of the change dissipation nodes Group B. The layout cell LCC' includes the congenial group of the change dissipation nodes Group C. The layout cell LCD' includes the congenial group of the change dissipation nodes Group D. The layout cell LCE' includes the congenial group of the change dissipation nodes Group E. The layout cell LCF' includes the congenial group of the change dissipation node Group F.

The subsets of the layout cells LCA'-LCF' with combinations of the charge collection nodes in the congenial groups of charge collection nodes Groups A-F that result in uncorrectable errors are not adjacent to one another. For example, the layout cells LCA'-LCB', the layout cells LCA' and LCC', the layout cells LCB'-LCC', the layout cells LCC'-LCD', the layout cells LCC' and LCE', the layout cells LCD'-LCE', and the layout cells LCE'-LCF' include combinations of the charge collection nodes that if simultaneously upset would result in uncorrectable errors. As such, the layout cells LCA'-LCB', the layout cells LCA' and LCC', the layout cells LCB'-LCC', the layout cells LCC'-LCD', the layout cells LCC' and LCE', the layout cells LCD'-LCE', and the layout cells LCE'-LCF' are not adjacent. In this embodiment, the layout cells LCA'-LCF' intersect the vector 134 and are stacked vertically along the vector 134 to form the column.

Figure 8:
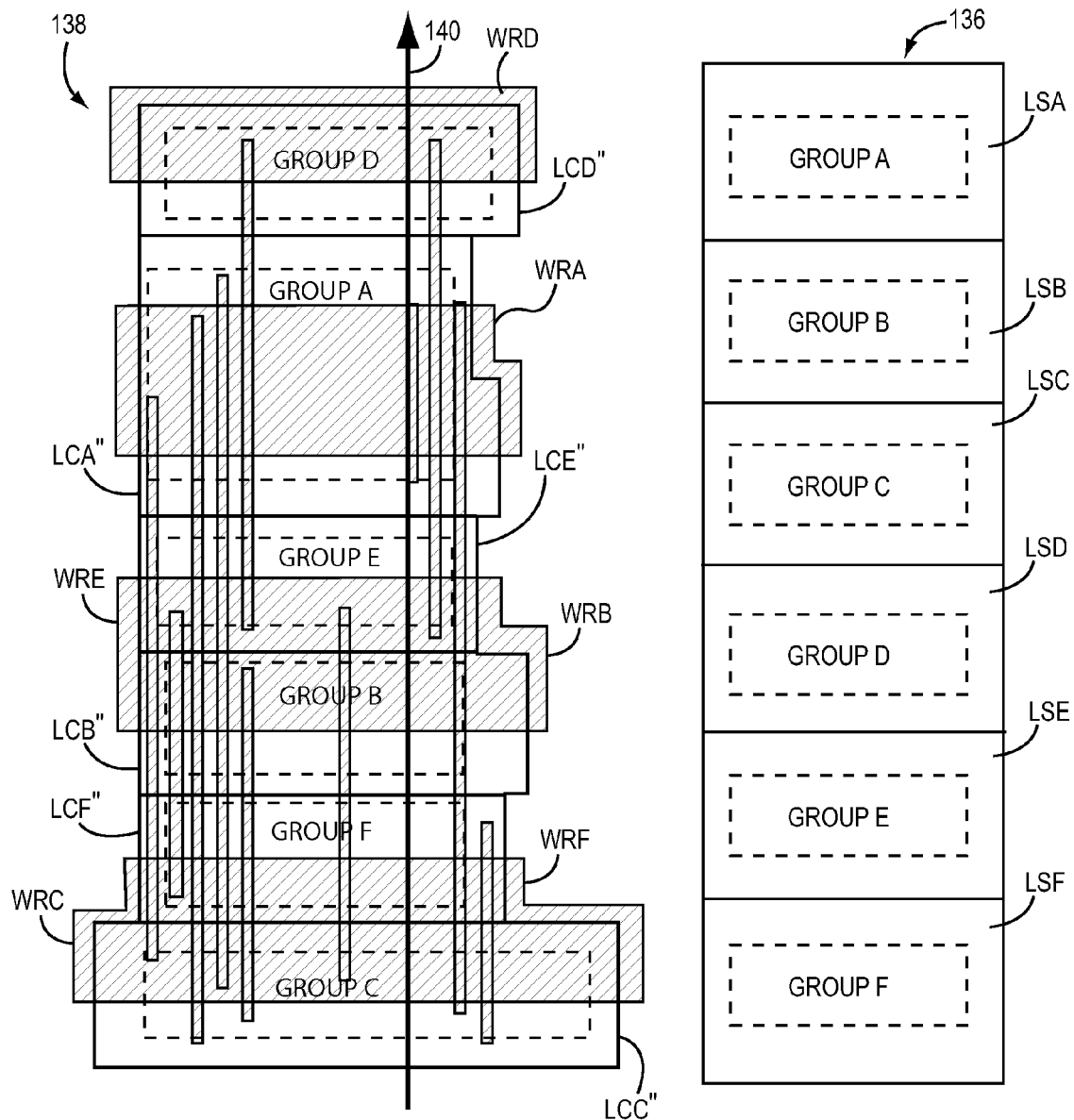
FIG. 8 illustrates one embodiment of a logical layout that logically represents the flip-flop shown in FIG. 5 and another embodiment of an exemplary physical layout that physically represents the flip-flop.

FIG. 8 illustrates one embodiment of a logical layout 136 that logically represents the flip-flop 86(1) (shown in FIG. 5) and another embodiment of a physical layout 138 that physically represents the flip-flop 86(1) (shown in FIG. 5). Like the physical layout 130 shown in FIG. 7, the physical layout 138 of FIG. 8 includes layout cells LCA"-LCF" physically representing the subcircuits A-F (shown in FIG. 5), respectively. The physical layout 138 defines a vector 140 and the layout cells LCA"-LCF" each intersect the vector 140 to form a column. However, unlike the physical layout 130 shown in FIG. 7, the column of the layout cells LCA"-LCF" is irregular and is not rectangular. Well representations (referred to generically as elements WR and specifically as WRA-WRF) in the physical layout 138 are also illustrated. In this case, the layout cells LCA"-LCF" may be multiple standard cell heights in height. For example, note that the layout cell LCA" in FIG. 8 has a cell height double a cell height of the other layout cells LCB"-LCF".

With regard to the logical layout 136, the logical layout 136 logically represents the flip-flop 86(1) and thus may be a logical representation of the flip-flop 86(1) shown in FIG. 5. The logical layout 136 may be a logical simulation layout generated using computer aided drafting (CAD) technology and VLSI. As shown in FIG. 8, the logical layout 136 is shown having logical sublayouts (referred to generically as elements LS and specifically as elements LSA-LSF) that logically represent the subcircuits A-F of the flip-flop 86(1) shown in FIG. 5. More specifically, the logical sublayout LSA logically represents the subcircuit A (shown in FIG. 5) and thus includes the congenial group of the charge collection nodes Group A. The logical sublayout LSB logically represents the subcircuit B (shown in FIG. 5) and thus includes the congenial group of the charge collection nodes Group B. The logical sublayout LSC logically represents the subcircuit C (shown in FIG. 5) and thus includes the congenial group of the charge collection nodes Group C. The logical sublayout LSD logically represents the subcircuit D (shown in FIG. 5) and thus includes the congenial group of the charge collection nodes Group D. The logical sublayout LSE logically represents the subcircuit E (shown in FIG. 5) and thus includes the congenial group of the charge collection nodes Group E. Finally, the logical sublayout LSF logically represents the subcircuit F (shown in FIG. 5) and thus includes the congenial group of the charge collection nodes (Group F). Accordingly, the logical sublayouts LS map bijectively to the layout cells LC of the physical layout 138.

Figure 9:
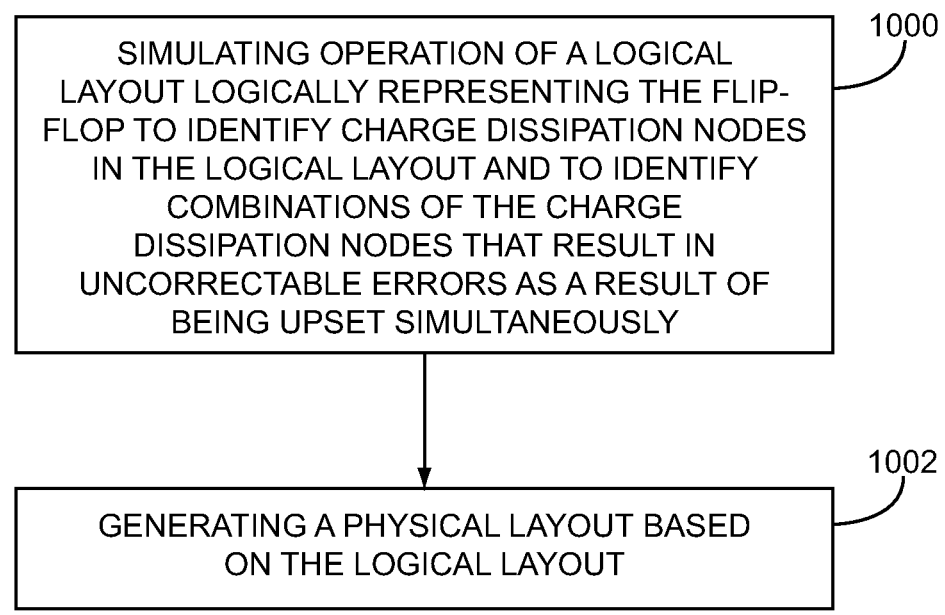
FIG. 9 illustrates one embodiment of a method of designing the flip-flop shown in FIGS. 5-7 by generating any of the physical layouts illustrated in FIGS. 6-8 for the flip-flop based on the logical layout shown in FIG. 8.

Referring now to FIG. 8 and FIG. 9, FIG. 9 illustrates one embodiment of a method of designing the flip-flop 86(1) shown in FIGS. 5-7. More specifically, any of the physical layouts 124, 130, and 138 (illustrated in FIGS. 6-8) for the flip-flop 86(1) (shown in FIGS. 5-7) may be generated based on the logical layout 136. However, with respect to the discussion herein, it is presumed that the physical layout 138 of FIG. 8 is generated based on the logical layout 136. In this embodiment, the method is implemented by one or more processors (not shown) executing computer-executable instructions (not shown) stored on a non-transitory computer-readable medium (not shown). For example, the processor(s) may implement a CAD software program to perform the method described in FIG. 9. The logical layout 136 of FIG. 8 may thus be a logical simulation layout used by the CAD software program.

With regard to the method, the processor(s) simulate operation of the logical layout 136 logically representing the flip-flop 86(1) to identify the charge collection nodes in the logical layout 136 and to identify combinations of the charge collection nodes that result in uncorrectable errors in the flip-flop 86(1) as a result of being upset simultaneously (block 1000). To identify the charge collection nodes in the logical layout 136, layout paths representing the setup paths 62A, 62B, the delay paths 66A, 66B, and the feedback paths 74A, 74B may be subdivided. More specifically, the layout paths are subdivided into those that have logic models of combinational logic gates and those that have logic models of hardening elements, such as the delay elements 50A, 50B, 50C, and 50D (shown in FIG. 5) and the tristate gates 52A and 52B (shown in FIG. 5).

In one embodiment, SETs may then be simulated by the processor(s) using an HSPICE Voltage Controlled Resistor (VCR) module. Simulations of the SETs indicating simulated charge collection at the nodes of the logical layout 136 may be identified as the charge collection nodes.

Simultaneous simulated charge collection of the charge collection nodes at both inputs and outputs of logic models of the hardening elements can result in uncorrectable errors. In one embodiment, to identify combinations of the charge collection nodes that result in uncorrectable errors in the flip-flop 86(1) (shown in FIG. 5) as a result of being upset simultaneously, test windows simulating all four types of pull-up and pull-down SETs (up-up, up-down, down-up, and down-down) may be simulated at possible charge collection nodes and all possible pairs of the charge collection nodes. Additionally, SETs are simulated at different instants of time during a simulated clock pulse. Resulting data from the simulations may be maintained in a data matrix, as described in further detail below.

In this embodiment, the processor(s) also identify the logical sublayouts LS logically representing the subcircuits A-F in the flip-flop 86(1) (shown in FIG. 5). To do this, the congenial groups of the charge collection nodes Groups A-F are identified through the simulation of charge collection. For example, if the charge collection nodes in a subset of the charge collection nodes are adjacent and are capable of being simultaneously upset without causing an uncorrectable error, the subset may be identified as one of the congenial groups of the charge collection nodes Groups A-F. Thus, a portion of the logical layout 136 with the identified congenial group of the charge collection nodes (one of Groups A-F) may be identified as one of the logical sublayouts LS that logically represents one of the subcircuits A-F (shown in FIG. 5) of the flip-flop 86(1) (shown in FIG. 5).

Once the congenial groups of charge collection nodes Groups A-F and the logical sublayouts LS have been identified, the processor(s) generate the physical layout 138 based on the logical layout 136 (block 1002). The physical layout 138 includes the layout cells LC" physically representing the subcircuits A-F of the flip-flop 86(1) (shown in FIG. 5). The combinations of the charge collection nodes that resulted in uncorrectable errors are in different layout cells LC". Furthermore, as explained above, the layout cells LC" are interleaved along the vector 140 such that the combinations of the charge collection nodes that result in uncorrectable errors are not adjacent. The processor(s) may determine hardened physical orders (e.g., [DAEBFC]) for the layout cells LC" from the results of the simulations, such as, for example, from the data matrix that records the results of the simulations.

A CAD placement tool may be used for placement of the layout cells LC" in the physical layout 138. For example, in one embodiment, the physical layout 138 is initially generated as the physical layout 130 in FIG. 7 and stored in a rectangular .lef (Library Exchange Format) file. The rectangular abstract contained in the .lef file is used in the automatic place and route flow in a digital IC design cycle. Normally, only rectangular lef abstracts can be used. However, CLASS and OVERLAP statements in the .lef file may be used to obtain optimal placements.

As such, the physical layout 130 may be initially loaded with all its collaterals. The CAD placement tool may use eight possible orientations for each of the layout cells LC" to place an abstract in one of these orientations with respect to an origin, which may be constant. However, nonrectangular cells may confuse the CAD placement tool. To place the nonrectangular layout cells LC" from the physical layout 138, a two-fold approach may be implemented to place the layout cells LC" in a rectilinear manner, whereby initial placement is done with the rectangular lef abstract contained in the .lef file. When the placement of the layout cells LC" is determined, their placement can be frozen and then converted to CLASS BLOCK with added OVERLAP statements. As such, a layout boundary can be provided as a polygon. In this manner, the layout cells LC" can be placed and moved so as to minimize area requirements. The OVERLAP statement may be added to the rectangular .lef file in the following format:

LAYER OVERLAP;
POLYGON x1 y1 x2 y2 x3 y3 . . . xn . . . yn;

This basic approach may be used in other CAD tools, although the specific commands may differ. The resulting flip-flop layout may be non-rectangular and such an arbitrary shape does not present a significant impediment to the flip-flops use in standard automated place and route (APR) flows, and may save overall silicon area.

Figure 10:
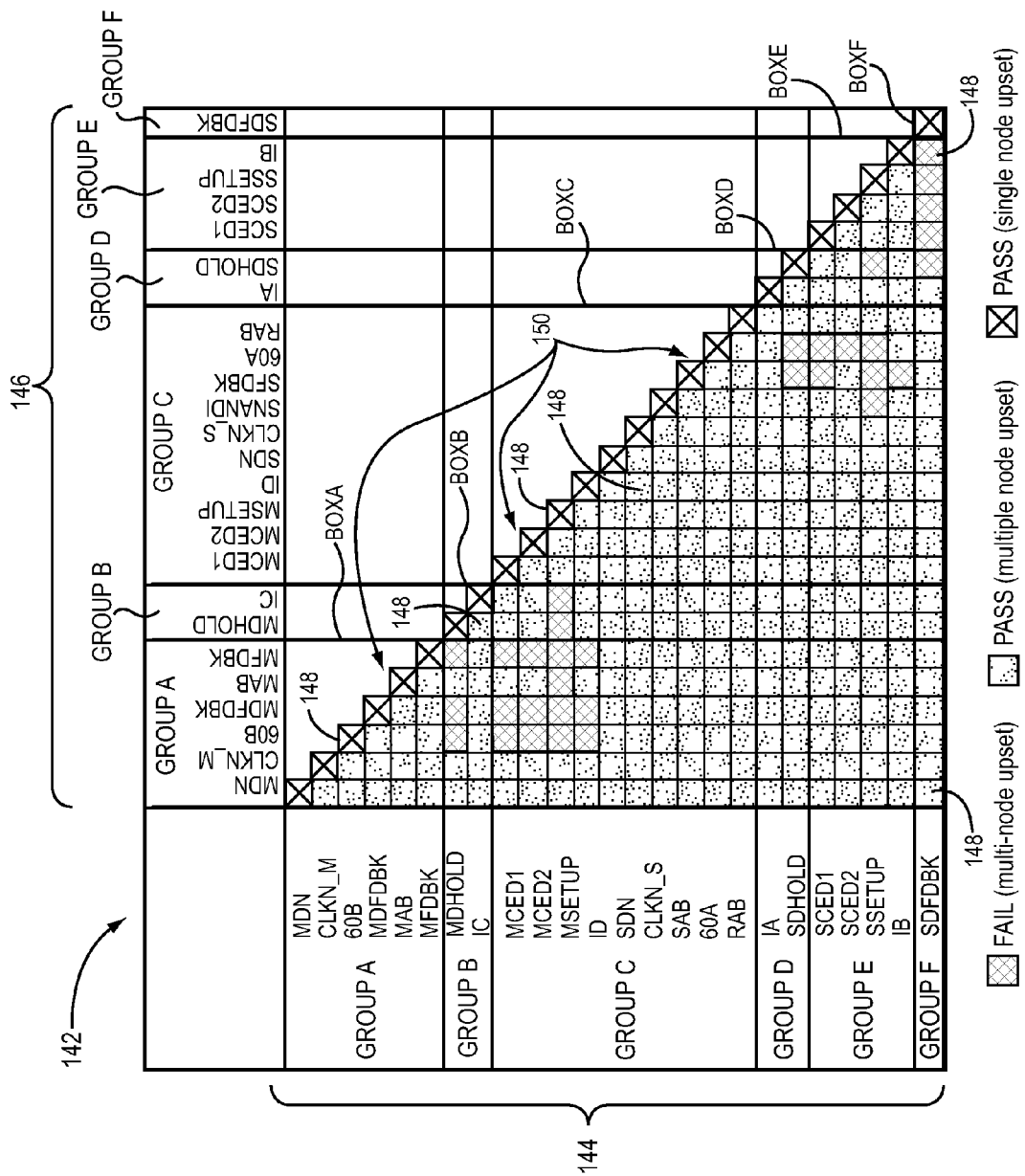
FIG. 10 is a visual representation of one embodiment of a data matrix that records the result of the simulations of the logical layout shown in FIG. 8 in accordance with the method described in FIG. 9.

FIG. 10 is a visual representation of one embodiment of a data matrix 142 that records the result of the simulations of the logical layout 136 described above with respect to block 1000 in FIG. 9. The data matrix 142 may be stored in a non-transitory computer-readable medium and may be provided as, or included in, any suitable type of data structure. Each of the charge collection nodes (i.e., the node MDN, the node CLKN_M, the storage node 60B, the node MDFDBK, the node MAB, the node MFDBK, the node MDHOLD, the node IC, the node MCED1, the node MCED2, the node MSETUP, the node ID, the node SDN, the node CLKN_S, the node SAB, the node SFDBK, the storage node 60A, the node RAB, the node IA, the node SDHOLD, the node SCED1, the node SCED2, the node SSETUP, the node IB, and the node SDFDBK) is identified in FIG. 10 along node identification rows 144 and node identification columns 146.

Result entries 148 (note that only a small subset of the result entries 148 is numbered for the sake of clarity) in the data matrix 142 record the result of the simulations. More specifically, for each of the result entries 148, the stored simulation result indicates whether a simultaneous upset on a combination of the charge collection node identified by the node identification row 144 and the charge collection node identified in the node identification column 146 resulted in an uncorrectable error. A key is provided in FIG. 10 so as to visually depict the results stored by each of the result entries 148 due to different pair combinations of the charge collection nodes. In this embodiment, the data matrix 142 is depicted as a lower triangular matrix since the results for an upper triangle of the data matrix 142 would simply be a repetition of the same data. Also, the result entries 148 along a main diagonal 150 of the data matrix 142 are simulations where only one of the charge collection nodes is upset since the same charge collection node is identified by the corresponding node identification row 144 and the node identification column 146.

Note that the congenial groups of the charge collection nodes Groups A-F are indicated along the main diagonal 150 by boxes (referred to generically as elements BOX and specifically as BOXA-BOXF) of groups of the result entries 148 in the data matrix 142. As shown in FIG. 10, a group of the result entries 148 identified by the box BOXA identifies the congenial group of the charge collection nodes Group A. A group of the result entries 148 identified by the box BOXB identifies the congenial group of the charge collection nodes Group B. A group of the result entries 148 identified by the box BOXC identifies the congenial group of the charge collection nodes Group C. A group of the result entries 148 identified by the box BOXD identifies the congenial group of the charge collection nodes Group D. A group of the result entries 148 identified by the box BOXE identifies the congenial group of the charge collection nodes Group E. Finally, a group of the result entries 148 identified by the box BOXF identifies the congenial group of the charge collection node Group F.

The charge collection nodes identified in each of the diagonal boxes BOX (e.g., BOXA, BOXB, etc.) are adjacent and do not include result entries 148 with combinations of the charge collection nodes that result in uncorrectable errors if simultaneously upset. As a result, the logical sublayouts LS, and thus the subcircuits A-F (shown in FIG. 5), of the flip-flop 86(1) are identified based on the data matrix 142. Furthermore, the data matrix 142 includes the result entries 148 that indicate the combinations of the charge collection nodes that result in uncorrectable errors when upset simultaneously. In this manner, the processor(s) use the data matrix 142 to interleave layout cells LC" (and thus also the subcircuits A-F of the flip-flop 86(1) shown in FIG. 5) of the physical layout 138 along the vector 140 in the hardened physical order (i.e., [DAEBFC]). The hardened physical order is selected by ensuring that the pairs of the layout cells LC" are not placed adjacent to one another if the pair of layout cells LC" includes one or more of the combinations of the charge collection nodes that result in uncorrectable errors if simultaneously upset. The physical layout 138 is thus provided in the hardened physical order, a priori, and without empirical testing. In other words, the physical layout 138 is hardened upon construction.

Figure 11A:
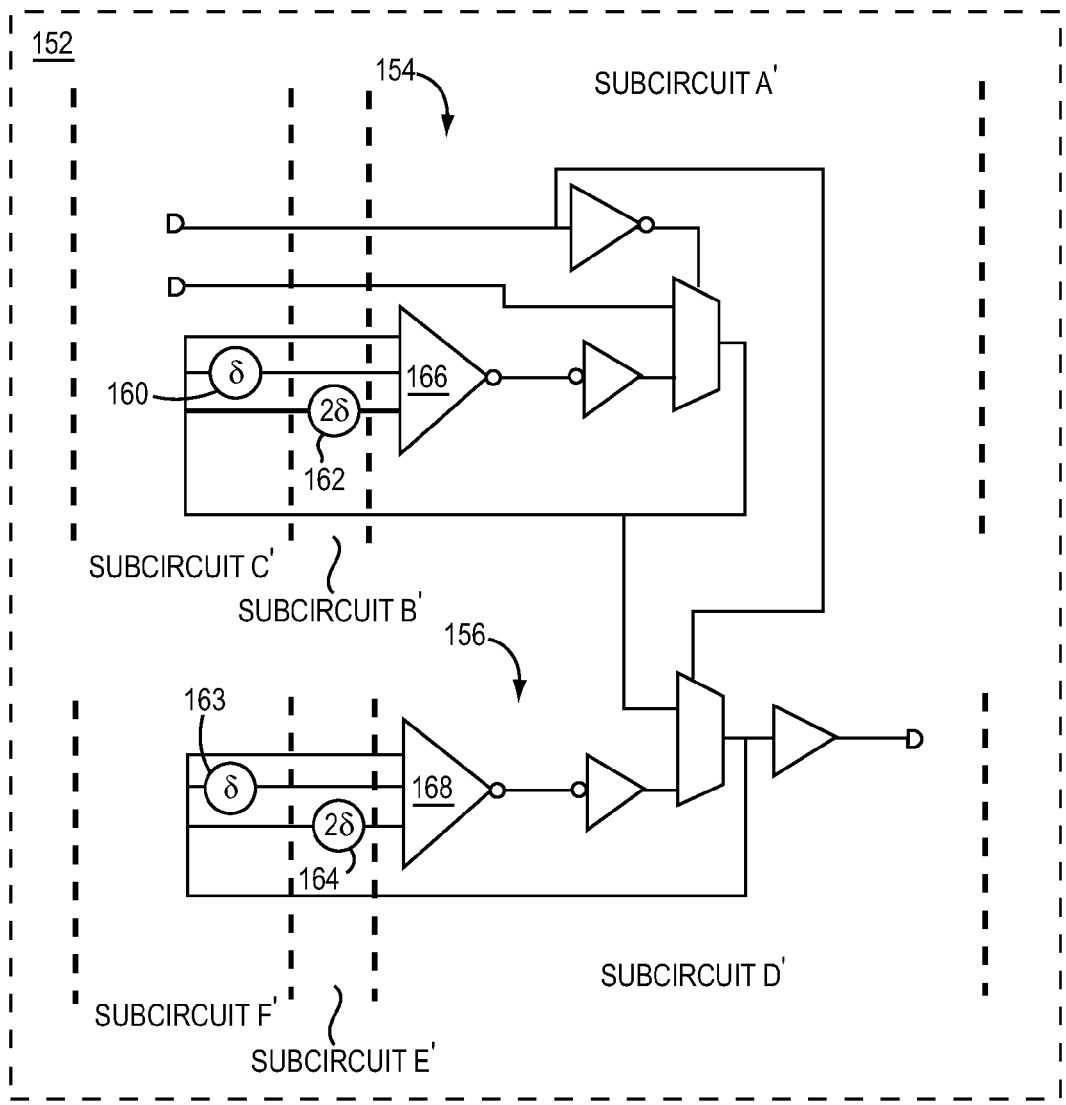
FIG. 11A illustrates another embodiment of a flip-flop.

FIG. 11A illustrates another embodiment of a hardened flip-flop 152. The flip-flop 152 has a master latch 154 and a slave latch 156. Furthermore, delay gates 160, 162, 163, and 164 and majority gates 166, 168 are utilized as hardening elements by the flip-flop 152. Note that the delay gates 162 and 164 have approximately twice the delay of the delay gates 160 and 163 as denoted by the 2δ. The delay gates 162 and 164 thus each have a propagation delay that is longer than a propagation delay of both of the delay gates 160 and 163. FIG. 11A illustrates the flip-flop 152 as having subcircuits A'-F'. In FIG. 11A, the flip-flop 152 is shown with the subcircuits A'-F' in a sequential logical order.

Figure 11B:
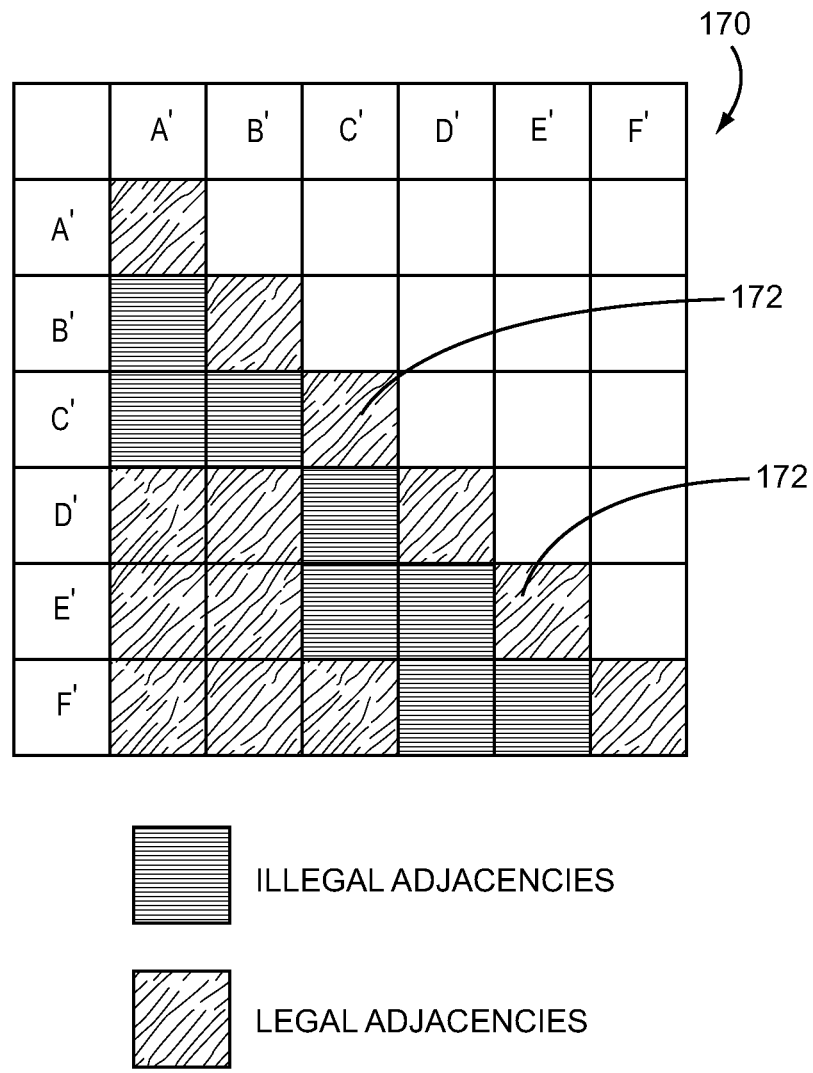
FIG. 11B is a visual representation of one embodiment of a data matrix resulting from simulations of single event transients (SETs) using a logical layout of the flip-flop shown in FIG. 11A.

Referring now to FIG. 11A and FIG. 11B, FIG. 11B is a visual representation of one embodiment of a data matrix 170 resulting from simulations of SETs using a logical layout (not shown) of the flip-flop 152 shown in FIG. 11A. Note that it is not necessary to display the nodes internal to each subcircuit as a single fail is sufficient to determine that there is a legal or illegal adjacency between the subcircuits. This is essentially treating all nodes within one BOX as the single super-node mentioned earlier. The data matrix 170 includes result entries 172 that indicate adjacencies of the subcircuits A'-F' with combinations of charge collection nodes that result in uncorrectable errors (i.e., illegal adjacencies) and adjacencies of the subcircuits A'-F' without combinations of the charge collection nodes resulting in uncorrectable errors (i.e., legal adjacencies). Thus, the data matrix 170 indicates hardened physical orders (i.e., [A'D'B'E'C'F'], [A'D'B'F'C'E'], [A'D'C'E'B'F'], [A'D'C'F'B'E'], [E'A'F'B'D'C']) for the subcircuits A'-F' of the flip-flop 152. The subcircuits A'-F' may thus be interleaved along a vector (such as the vector 126 shown in FIG. 6 and the vector 132 shown in FIG. 7) defined by a substrate (such as the semiconductor substrate 120 shown in FIGS. 6 and 7) in any of these hardened physical orders (i.e.,

[A'D'B'E'C'F'], [A'D'B'F'C'E'], [A'D'C'E'B'F'], [A'D'C'F'B'E'], [E'A'F'B'D'C']). In one embodiment, the hardened physical orders that provide the least inter-circuit routing are chosen (i.e., [A'D'B'E'C'F'], [A'D'B'F'C'E'], [A'D'C'E'B'F'], [E'A'F'B'D'C'], [A'D'C'F'B'E']). This example illustrates that the hardening approaches described here are general and can be applied to flip-flops using other hardening approaches, as all subcircuits in hardened flip-flops can be categorized as combinational, delay, or hardening.

Referring now to FIGS. 11A and 11B, the hardened physical order of the flip-flop 152 may be selected as the hardened physical order of [A'D'B'E'C'F']. As shown in FIG. 11A, the subcircuit A' includes the majority gate 166; a storage node; and a sampling stage, which is a portion of the master latch 154. The subcircuit B' includes the delay gate 162, which is a portion of the master latch 154. The subcircuit C' includes the delay gate 160, which is a portion of the master latch 154. The subcircuit D' includes the majority gate 168; a storage node; and a sampling stage, which is a portion of the slave latch 156. The subcircuit E' includes the delay gate 164, which is a portion of the slave latch 156. Finally, the subcircuit F' includes the delay gate 163, which is a portion of the slave latch 156. With the hardened physical order of [E'A'F'B'D'C'], the portion of the master latch 154 in the subcircuit A' is interleaved along a vector between the portion of the slave latch 156 with the delay gate 164 in the subcircuit E' and the portion of the slave latch 156 with the delay gate 163 in the subcircuit F'. Furthermore, the portion of the slave latch 156 in the subcircuit D' is interleaved along the vector between the portion of the master latch 154 with the delay gate 162 in the subcircuit B' and the portion of the master latch 154 with the delay gate 160 in the subcircuit C'.

These techniques may also be implemented with DICE flip-flops having master latches and slave latches. The first portion of the master latch in a first subcircuit comprises a first DICE storage node and a first sampling stage of the master latch. For example, with regard to a DICE flip-flop, a first portion of the slave latch in a first subcircuit may include a first DICE storage node and a first sampling stage of the slave latch. A first portion of the master latch in a second subcircuit comprises a first DICE storage node and a first sampling stage of the master latch. A second portion of the master latch in a third subcircuit may include a second DICE storage node and a second sampling stage of the master latch. Finally, a second portion of the master latch in a fourth subcircuit may include a second DICE storage node and a second sampling stage of the slave latch. The first, second, third, and fourth subcircuits of the DICE flip-flop are interleaved along a vector of a semiconductor substrate. More specifically, the first subcircuit may be interleaved so as to be between the second subcircuit and the third subcircuit. Additionally, the third subcircuit may be interleaved so as to be between the first subcircuit and the fourth subcircuit.

Those skilled in the art will recognize improvements and modifications to the preferred embodiments of the present disclosure. All such improvements and modifications are considered within the scope of the concepts disclosed herein and the claims that follow.

What is claimed is:

1. A flip-flop comprising:
    a substrate that defines a vector; and
    subcircuits formed on the substrate and operable to provide subfunctions, wherein:
        each subcircuit of the subcircuits is configured to provide a corresponding subfunction of the subfunctions;
        the subfunctions are provided in a sequential logical order so as to provide a flip-flop function; and
        the subcircuits are interleaved along the vector out of the sequential logical order with respect to the corresponding subfunction provided by each of the subcircuits.

2. The flip-flop of claim 1 wherein each of the subcircuits abuts the vector.

3. The flip-flop of claim 1 wherein each of the subcircuits intersects the vector.

4. The flip-flop of claim 1 wherein the subcircuits are interleaved along the vector to form a row.

5. The flip-flop of claim 1 wherein the subcircuits are interleaved along the vector to form a column.

6. The flip-flop of claim 1 further comprising:
    charge collection nodes;
    hardening elements, wherein for each hardening element of the hardening elements, a charge collection node of the charge collection nodes that drives an input of the hardening element and a charge collection node of the charge collection nodes being driven by an output of the hardening element are provided in a different subset of the subcircuits.

7. The flip-flop of claim 6 wherein the subcircuits are interleaved along the vector such that for each of the hardening elements, the different subset of the subcircuits is a nonadjacent subset of the subcircuits.

8. The flip-flop of claim 1 further comprising charge collection nodes wherein:
    combinations of the charge collection nodes result in uncorrectable errors by the flip-flop if simultaneously upset; and
    the subcircuits are interleaved along the vector such that the combinations of the charge collection nodes are found only among nonadjacent subsets of the subcircuits.

9. The flip-flop of claim 1 further comprising charge collection nodes wherein:
    the charge collection nodes comprise congenial groups of one or more of the charge collection nodes; and
    each of the subcircuits includes a corresponding congenial group of one or more of the charge collection nodes from the congenial groups of one or more of the charge collection nodes.

10. The flip-flop of claim 9 further comprising:
    combinations of the charge collection nodes from the congenial groups of one or more of the charge collection nodes, wherein the combinations of the charge collection nodes result in uncorrectable errors by the flip-flop if simultaneously upset; and
    wherein the subcircuits are interleaved along the vector such that the combinations of the charge collection nodes are found only among nonadjacent subsets of the subcircuits.

11. The flip-flop of claim 1 comprising:
    a master latch; and
    a slave latch operably associated with the master latch so that the flip-flop provides the flip-flop function.

12. The flip-flop of claim 11 wherein:
    a first subset of the subcircuits includes portions of the master latch;
    a second subset of the subcircuits includes portions of the slave latch, wherein the second subset of the subcircuits is different from the first subset of the subcircuits; and
    the first subset of the subcircuits is interleaved with the second subset of the subcircuits along the vector such that the portions of the master latch are interleaved with the portions of the slave latch.

13. The flip-flop of claim 11 wherein:
the subcircuits comprise at least a first subcircuit, a second subcircuit, and a third subcircuit, wherein the subcircuits are interleaved along the vector such that the first subcircuit is interleaved so as to be between the second subcircuit and the third subcircuit.

14. The flip-flop of claim 13 wherein:
the first subcircuit includes a first portion of the master latch;
the second subcircuit includes a first portion of the slave latch; and
the third subcircuit includes a second portion of the slave latch.

15. The flip-flop of claim 14, wherein:
he first portion of the master latch in the first subcircuit comprises a storage node, a sampling stage, and a majority gate of the master latch;
the first portion of the slave latch in the second subcircuit comprises a first delay element of the slave latch; and
the second portion of the slave latch in the third subcircuit comprises a second delay element of the slave latch, wherein the second delay element has a longer propagation delay than the first delay element.

16. The flip-flop of claim 14 wherein:
the subcircuits further comprise a fourth subcircuit that includes a second portion of the master latch, wherein the third subcircuit is interleaved so as to between the first subcircuit and the fourth subcircuit;
the first portion of the master latch in the first subcircuit comprises a first DICE storage node and a first sampling stage of the master latch;
the first portion of the slave latch in the second subcircuit comprises a second DICE storage node and a first sampling stage of the slave latch;
the second portion of the slave latch in the third subcircuit comprises a third DICE storage node and a second sampling stage of the slave latch; and
the second portion of the master latch in the fourth subcircuit comprises a fourth DICE storage node and a second sampling stage of the master latch.

17. The flip-flop of claim 13 wherein:
the first subcircuit includes a first portion of the slave latch;
the second subcircuit includes a first portion of the master latch; and
the third subcircuit includes a second portion of the master latch.

18. The flip-flop of claim 17, wherein
the first portion of the slave latch in the first subcircuit comprises a storage node, a sampling stage, and a majority gate of the slave latch;
the first portion of the master latch in the second subcircuit comprises a first delay element of the master latch; and
the second portion of the master latch in the third subcircuit comprises a second delay element of the master latch, wherein the second delay element has a longer propagation delay than the first delay element.

19. The flip-flop of claim 17 wherein:
the subcircuits further comprise a fourth subcircuit that includes a second portion of the slave latch, wherein the third subcircuit is interleaved so as to between the first subcircuit and the fourth subcircuit;
the first portion of the slave latch in the first subcircuit comprises a first DICE storage node and a first sampling stage of the slave latch;
the first portion of the master latch in the second subcircuit comprises a second DICE storage node and a first sampling stage of the master latch;
the second portion of the master latch in the third subcircuit comprises a third DICE storage node and a second sampling stage of the master latch; and
the second portion of the slave latch in the fourth subcircuit comprises a fourth DICE storage node and a second sampling stage of the slave latch.

20. The flip-flop of claim 1 further comprising:
a storage node;
a sampling stage configured to:
receive an input bit signal having an input bit state; and
generate a first output bit signal having a first output bit state that is held at the storage node, wherein the first output bit state is set in accordance with the input bit state while the sampling stage is transparent;
a delay element coupled to the storage node, wherein the delay element is configured to generate a second output bit signal having a second output bit state in accordance with the first output bit state of the first output bit signal; and
a tristate gate coupled to the storage node and to the delay element, wherein the tristate gate is configured to:
generate a second input bit signal having a second input bit state;
set the second input bit state in accordance with the first output bit state and the second output bit state when the first output bit state and the second output bit state are equal; and hold the second input bit state when the first output bit state and the second output bit state are unequal.

21. The flip-flop of claim 20 wherein:
the subcircuits comprise at least a first subcircuit, a second subcircuit, and a third subcircuit, wherein the subcircuits are interleaved along the vector such that the first subcircuit is interleaved so as to be between the second subcircuit and the third subcircuit;
the first subcircuit comprises the storage node and the sampling stage;
the second subcircuit comprises the delay element; and
the third subcircuit comprises the tristate gate.

22. The flip-flop of claim 21 wherein the delay element is further configured to have a propagation delay that is longer than a maximum single event transient (SET) duration.

23. The flip-flop of claim 21 wherein the delay element comprises one or more internal nodes, one or more output nodes, and field effect transistors (FETs) that include gates, wherein the delay element is further configured to produce a single event transient (SET) duration that is shorter than or equal to a worst-case of the gates when removing charge collected due to ionizing radiation at the one or more internal nodes or the one or more output nodes.

24. The flip-flop of claim 21 wherein the delay element comprises one or more internal nodes and one or more output nodes, wherein the delay element is further configured not to propagate a single event transient (SET) at the one or more internal nodes to the one or more output nodes.

25. The flip-flop of claim 1 wherein the substrate includes wells configured such that the vector is defined in a direction along the wells.

26. The flip-flop of claim 1 wherein the substrate includes wells configured such that the vector is defined in a direction across the wells.

27. The flip-flop of claim 1, further comprising:
a master latch; and
a slave latch operably associated with the master latch so that the flip-flop provides the flip-flop function;

charge collection nodes, wherein the charge collection nodes include congenial groups of the charge collection nodes;

wherein the subcircuits include a corresponding congenial group of the charge collection nodes;

wherein the substrate includes wells and pairs of the congenial group of the charge collection nodes in adjacent pairs of the subcircuits share a corresponding one of the wells;

wherein portions of the master latch are provided in a first subset of the subcircuits;

wherein portions of the slave latch are provided in a second subset of the subcircuits; and wherein the subcircuits are further interleaved along the vector such that the first subset of the subcircuits with the portions of the master latch does not include the adjacent pairs of the subcircuits with the pairs of the congenial group of the charge collection nodes that share the corresponding one of the wells, and the second subset of the subcircuits with the portions of the slave latch also does not include the adjacent pairs of the subcircuits with the pairs of the congenial group of the charge collection nodes that share the corresponding one of the wells.

28. The flip-flop of claim 1 wherein at least some of the subcircuits have different physical widths.

29. The flip-flop of claim 1 where one or more of the subcircuits have a physical shape that is non-rectangular.

30. A flip-flop comprising:
a substrate that defines a vector; and
subcircuits formed on the substrate in a physical order wherein:
the subcircuits are configured to operate in a sequential logical order to provide a flip-flop function, and wherein the subcircuits are interleaved along the vector so that the physical order of the subcircuits is different from the sequential logical order.

31. The flip-flop of claim 30 wherein each of the subcircuits abuts the vector.

32. The flip-flop of claim 30 wherein each of the subcircuits intersects the vector.

33. The flip-flop of claim 30 further comprising:
charge collection nodes;
hardening elements, wherein for each hardening element of the hardening elements, a charge collection node of the charge collection nodes that drives an input of the hardening element and a charge collection node being driven by an output of the hardening element are provided in a different subset of the subcircuits.

34. The flip-flop of claim 33 wherein the subcircuits are interleaved along the vector such that for each of the hardening elements, the different subset of the subcircuits is a nonadjacent subset of the subcircuits.

35. The flip-flop of claim 33 further comprising charge collection nodes wherein:
combinations of the charge collection nodes result in uncorrectable errors by the flip-flop if simultaneously upset; and
the subcircuits are interleaved along the vector such that the combinations of the charge collection nodes are found only among nonadjacent subsets of the subcircuits.

36. The flip-flop of claim 30 further comprising charge collection nodes wherein:
the charge collection nodes comprise congenial groups of one or more of the charge collection nodes; and
each of the subcircuits includes a corresponding congenial group of one or more of the charge collection nodes from the congenial groups of the one or more charge collection nodes.

37. The flip-flop of claim 36 further comprising:
combinations of the charge collection nodes from the congenial groups of one or more of the charge collection nodes, wherein the combinations of the charge collection nodes result in uncorrectable errors by the flip-flop if simultaneously upset; and
wherein the subcircuits are interleaved along the vector such that the combinations of the charge collection nodes are found only among nonadjacent subsets of the subcircuits.

38. The flip-flop of claim 30 comprising:
a master latch; and
a slave latch operably associated with the master latch so that the flip-flop provides the flip-flop function.

39. The flip-flop of claim 38 wherein:
a first subset of the subcircuits includes portions of the master latch;
a second subset of the subcircuits includes portions of the slave latch, wherein the second subset of the subcircuits is different from the first subset of the subcircuits; and
the first subset of the subcircuits is interleaved with the second subset of the subcircuits along the vector such that the portions of the master latch are interleaved with the portions of the slave latch.

40. The flip-flop of claim 38 wherein:
the subcircuits comprise at least a first subcircuit, a second subcircuit, and a third subcircuit, wherein the subcircuits are interleaved along the vector such that the first subcircuit is interleaved so as to be between the second subcircuit and the third subcircuit.

41. The flip-flop of claim 40 wherein:
the first subcircuit includes a portion of the master latch;
the second subcircuit includes a first portion of the slave latch; and
the third subcircuit includes a second portion of the slave latch.

42. The flip-flop of claim 40 wherein:
the first subcircuit includes a portion of the slave latch;
the second subcircuit includes a first portion of the master latch; and
the third subcircuit includes a second portion of the master latch.

43. A method of designing a flip-flop, comprising:
simulating operation of a logical layout logically representing the flip-flop to identify charge collection nodes in the logical layout and to identify combinations of the charge collection nodes that result in uncorrectable errors as a result being upset simultaneously; and
generating a physical layout based on the logical layout wherein:
the physical layout physically represents the flip-flop that is logically represented by the logical layout;
the physical layout defines a vector; and
the physical layout includes layout cells physically representing subcircuits of the flip-flop such that each of the layout cells represents a corresponding subcircuit of the subcircuits of the flip-flop and the layout cells are interleaved along the vector such that each combination of the combinations of the charge collection nodes that result in uncorrectable errors is provided in a nonadjacent subset of the layout cells.

44. The method of claim 43 wherein simulating operation of the logical layout further comprises identifying logical sublayouts of the logical layout logically representing the subcircuits of the flip-flop with congenial groups of the charge collection nodes such that each of the logical sublayouts logically represents a corresponding subcircuit of the subcircuits of the flip-flop with a corresponding congenial group of the congenial groups of the charge collection nodes.

45. The method of claim 44 wherein generating the physical layout further comprises generating the layout cells in accordance with the logical sublayouts so that each of the layout cells physically represents the corresponding subcircuit of a corresponding one of the logical sublayouts.

\* \* \* \* \*